United States Patent [19]
Yamazaki et al.

[11] Patent Number: 5,412,628
[45] Date of Patent: May 2, 1995

[54] APPARATUS FOR INTERMITTENTLY RECORDING AND REPRODUCING A SIGNAL ON A DISC TYPE RECORDING MEDIUM

[75] Inventors: Shohei Yamazaki; Kazuhiko Honda; Sadayuki Narusawa, all of Hamamatsu, Japan

[73] Assignee: Yamaha Corporation, Japan

[21] Appl. No.: 131,406

[22] Filed: Oct. 1, 1993

[30] Foreign Application Priority Data

Oct. 5, 1992 [JP] Japan ................... 4-290769
Nov. 4, 1992 [JP] Japan ................... 4-319504
Dec. 18, 1992 [JP] Japan ................... 4-356119
Dec. 24, 1992 [JP] Japan ................... 4-357533

[51] Int. Cl.$^6$ .......................................... G11B 17/22
[52] U.S. Cl. ........................... 369/32; 369/48; 369/54
[58] Field of Search ................... 369/32, 47-48, 369/53-54, 58, 44.11, 83, 50, 44.26, 44.25, 44.13, 59, 43, 33; 360/74.1, 52, 10.1, 9.1, 72.1

[56] References Cited
U.S. PATENT DOCUMENTS 5,097,459  3/1992  Yoshio ........................ 369/48
5,109,369  4/1992  Maeda et al. ............... 369/32 X

*Primary Examiner*—Georgia Y. Epps
*Assistant Examiner*—Ali Neyzari
*Attorney, Agent, or Firm*—Graham & James

[57] ABSTRACT

An apparatus for recording and reproducing a signal on a disc type recording medium includes a recording section for intermittently writing on a disc data to be recorded whose bit rate is ½ or less of a rate of recording data on the disc during a recording mode, a reproduction section for intermittently reading from the disc reproduced data whose bit rate is ½ or less of a rate of reproducing data from the disc during a reproduction mode, and a write and/or read unit for performing writing and/or reading on the disc during waiting time in the recording and/or reproduction mode. The apparatus is capable of monitoring recorded data instantaneously during the recording mode, editing recorded data with standard recording and reproducing heads, recording and reproducing a four-channel signal with heads for a two-channel signal, and dubbing data read from a reproducing optical disc to a recording optical disc with a recording magnetic head and a recording and reproducing optical head.

9 Claims, 17 Drawing Sheets

APPARATUS FOR INTERMITTENTLY RECORDING AND REPRODUCING A SIGNAL ON A DISC TYPE RECORDING MEDIUM

BACKGROUND OF THE INVENTION

This invention relates to an apparatus for recording and reproducing a signal on a disc type recording medium. More particularly, this invention relates to an apparatus of this type capable of monitoring recording data instantaneously during a recorded mode or editing recorded data with standard recording and reproducing heads. The invention relates also to an apparatus of this type capable of recording and reproducing a four-channel signal with recording and reproducing heads for a two-channel signal. The invention relates also to an apparatus of this type capable of dubbing data read from a reproducing optical disc to a recording optical disc with a set of a recording magnetic head and a recording and reproducing optical head.

Since a Compact Disc was developed as a superior recording medium to an analog record, some other new recording media have been developed. A Mini Disc (MD) is one of these newly developed recording media. The Mini Disc is attracting attention of the industry as a prospective audio reccording medium which has portability of the Compact Cassette and also operability and tone quality of the Compact Disc.

Since the MD has adopted a new audio compression system while employing the PCM system similar to the CD, the MD can realize a high tone quality which is about the same as the CD with the amount of information which is about half of the CD. For this reason, reproduction time which is about the same as the CD can be realized with a disc having a diameter which is about half that of the CD.

There are two types of MDs. One of them is a reproduction only MD which is made of an optical disc similar to the CD. The other type of MD which is capable of both recording and reproduction is made of a magneto-optical disc. An MD player adapted to these two types of MDs has not only an optical head for recording and reproduction but also a magnetic head for recording.

An MD player capable of both recording and reproduction has a recording mode in which the MD player writes data to be recorded on a disc and also a reproduction mode in which the MD player reads reproduced data from the disc. The user selects one of these modes in using the MD player.

For confirming instantaneously whether or not input data is accurately recorded while the input data is being recorded during the recording mode, the MD player must have a monitoring function. This monitoring function is different from a normal reproduction mode function because it is necessary to read out and reproduce recorded data instantaneously while the selected mode is the recording mode.

In the case of the MD player, reading of reproduced data is made with an optical head. This optical head can be used in the reading mode also in case a magneto-optical disc is mounted in the player. If, therefore, it is desired to monitor recording instantaneously during the recording mode, another optical head for the monitoring purpose will be required.

If, however, an extra optical head for monitoring is mounted in the MD player, a peripheral circuit (including an automatic laser beam control circuit and a servo control circuit) will also be required with the result that the structure of the MD player becomes complex and the manufacturing cost will naturally increase. Particularly, it is not desirable for an MD player for which portability is an important factor to be unable to realize a compact type MD player due to complexity of the structure and increased number of component parts.

It is, therefore, a first object of the invention to provide an apparatus for recording and reproducing a signal on a disc type recording medium capable of monitoring recording instantaneously with only a set of standard recording and reproducing heads without requiring an extra optical head for the monitoring purpose.

There is a case where music data which has once been recorded is subsequently processed and edited. In this case, there is required an editing mode using both the recording mode and the reproduction mode. A normally expected editing function includes overdubbing according to which recorded data is read out and, after new music data is added to a part of the read out data, is recorded again, so-called pingpong recording according to which plural recorded data are mixed and then recorded again, and punch-in/punch-out recording according to which a part of recorded data is changed to new music data.

For performing editing function by a conventional MD player, it is conceivable either (1) to reproduce data from an original disc by the MD player for reproduction and then recording data after editing on a recording disc by another recording player or (2) to provide an optical head for reproduction and a magneto-optical head for recording in a single player and perform reproduction and recording after editing on the same disc in real time.

In the two player system of (1) above, however, the player for reproduction only must be provided for the sole purpose of editing and this is apparently inefficient. This system is also disadvantageous in that edited data cannot be recorded on the same disc.

The two head system of (2) above can record edited data on the same disc in real time. This system, however, requires an extra optical head for reproduction only accompanied by its peripheral circuit. This makes the circuit complicated and increases the manufacturing cost.

It is, therefore, a second object of the invention to provide an apparatus for recording and reproducing a signal on a disc type recording medium capable of performing editing of recorded data with a standard set of recording and reproducing heads only.

An MD player generally has a function, as one of its standard functions, of recording and reproducing a two-channel music signal. In a case where it is desired to realize recording and reproduction of a four-channel music signal with this type of MD player, it is conceivable (1) to operate two MD players using a single common disc with the same master clock so that one MD player will record and reproduce signals of first and second channels and the other MD player will record and reproduce signals of third and fourth channels in synchronism with each other, or (2) to adopt a special format which is different from a standard format to record and reproduce a four-channel signal with a single MD player.

The two player system of (1) above, however, is expensive because it requires two players and, moreover, the circuit as a whole becomes complex and large.

The special format system of (2) above cannot be carried out under the current standard and, moreover, such system will not be compatible with a normal MD player using a standard format.

It is, therefore, a third object of the invention to provide an apparatus for recording and reproducing a signal on a disc type recording medium which, notwithstanding that it has a function of recording and reproducing only a two-channel signal and uses only a standard format, is capable of recording and reproducing a four-channel signal with only a pair of recording and reproducing heads.

For dubbing data from one disc to another by using an optical disc type recording and reproducing apparatus, a double-deck type device is generally proposed according to which data is read from a reproduction only disc by a reproduction only deck and this data is recorded in a recording disc by a different recording only deck. This double-deck type device is actually used in the field of the Compact Cassette. For realizing the double-deck type device in an optical disc type recording and reproducing device such as an MD player, however, circuits as shown in FIGS. 18 and 19 are required.

The circuit of FIG. 18 is based on a general disc recording and reproducing type MD deck. In FIG. 18, reference character 41 designates a disc, 42 a spindle motor for rotating this disc 41 at a constant linear velocity, 43 an optical pick-up for optically reading information from the disc 41 or magneto-optically writing information on the disc 41, 44 a feed motor for moving this pick-up 43 in the radial direction of the disc 41, 45 a high frequency (RF) amplifier for amplifying the output of the pick-up 43 and 46 a servo control section for peforming a rotation control for the spindle motor 42, a feed control for the feed motor 44 and a focus tracking control for the pick-up 43.

A reading system of this MD player includes an EFM decoder section of an EFM encoder/decoder 47 for decoding the output of the amplifier 45, an address decoder 48 for detecting, from the output of the amplifier 45, an address of data being reproduced, a memory 49 for temporarily storing the decoder output of the EFM encoder/decoder 47, a controller 50 for the memory 49, an audio compression decoder section of an audio compressor encoder/decoder 41 for expanding the output of the memory 49, and a digital-to-analog converter 52 for converting the expansion output of the audio compression decoder section to an analog signal.

The EFM encoder/decoder 47 adopts EFM (eight to fourteen modulation) as its modulation system and CIRC (cross interleave Reed-Solomon code) as its error correction system.

A writing system of this MD player includes an analog-to-digital conversion section 53 for converting an analog signal to a digital signal, an encoder section of the audio compressor encoder/decoder 51 for compressing the converted digital signal for removing an unnecessary component for reproduction of an audio signal from the digital signal, the memory 49 for temporarily storing compressed signal and the controller 50 for the memory 49, an EFM encoder section of the EFM encoder/decoder 47 fOF EFM modulating the output of the memory 49, a recording head (magnetic head) 54 for writing the encoded signal on the disc 41 in association with the optical pick-up 43.

There are also provided a system controller 56 which controls the entire MD player, a display 57 which displays various information and operation keys 58 which impart various instructions.

For constructing a double-deck for dubbing on the basis of the above described recording and reproducing deck, a reproduction only deck as shown in FIG. 19 must be added. The circuit of FIG. 19 includes an optical disc 41R for reproduction, a spindle motor 42R for rotating the disc 41R at a constant linear velocity, an optical pick-up 43R for reading information optically from the disc 41R, a feed motor 44R for moving the pick-up 43R in the radial direction of the disc 41R, a high frequency amplifier 45R for amplifying the output of the pick-up 43R and a servo control section 46R for rotation control of the spindle motor 42R, feed control of the feed motor 44R and focus tracking of the pick-up 43R.

This reproduction only MD player has only a reading system including an EFM decoder 47R for demodulating the output of the amplifier 45R, an address decoder 48R for detecting, from the output of the amplifier 45R, address of data being reproduced, a memory 49R for temporarily storing the decoder output of the EFM decoder 47R and an intermittent reproduction memory controller 50R and an audio compressor decoder 51R for expanding the output of the memory 49R. The reproduction only MD player uses the system controller 56 commonly and supplies the expansion output of the audio compressor decoder 51R to the digital-to-analog converter 52 (for monitoring) or to the audio compressor encoder/decoder 51 for dubbing.

For enabling such double-deck construction, two switches 59 and 60 as shown in FIG. 18 are added. The first switch 59 is provided for selecting input to the digital-to-analog converter 52. The switch 59 selects, in the illustrated state, the expansion data read from the reproduction only disc 41R and, when the switch 59 is connected to the other side, selects the expansion data read from the recording and reproduction disc 41. The second switch 60 is provided for selecting input to the audio compressor encoder/decoder 51R. The illustrated state shows a dubbing mode in which the switch 60 selects the output of the audio compressor decoder 51R. When the first switch 59 is connected in the illustrated state in the dubbing mode, monitoring can be made simultaneously. When the switch 60 is connected to the other side, the output of the analog-to-digital converter 53 is selected so that the mode becomes a normal recording mode in which audio input from outside is recorded in the recording and reproduction disc 41.

The above described double deck structure is based on the concept that a reproduction only deck is provided in addition to a recording and reproducing deck and, accordingly, component parts for two decks are required for most component parts excluding few component parts such as the digital-to-analog converter 52, analog-to-digital converter 53 and system controller 56. This requires a very complex circuit which increases the manufacturing cost. Particularly, the circuit requires two optical pick-ups which are indispensable for an optical disc and the optical pick-up is very expensive compared with a magnetic head used for a Compact Cassette so that it is difficult to avoid increase in the manufacturing cost.

It is, therefore, a fourth object of the invention to provide an apparatus for recording and reproducing a signal on a disc type recording medium which is capable of dubbing data from a reproducing optical disc to a recording optical disc by using a single recording and reproducing deck and particularly using a single optical pick-up.

SUMMARY OF THE INVENTION

For achieving the first object of the invention, an apparatus for recording and reproducing a signal on a disc type recording medium comprises recording means for intermittently writing on the disc data to be recorded whose bit rate is ½ or less of a rate of recording data on the disc during a recording mode, reproduction means for intermittently reading from the disc reproduced data whose bit rate is ½ or less of a rate of reproducing data from the disc during a reproduction mode, and write and/or read means for performing writing and/or reading on the disc during waiting time in the recording and/or reproduction mode.

In one aspect of the invention, the write and/or read means comprises recorded signal monitoring means for reading out immediately preceding recorded data during waiting time in the recording mode.

In another aspect of the invention, the recording means comprises a recorded signal processing section for processing the data to be recorded and the reproduction means comprises a reproduced signal processing section for processing the reproduced data, and said reproduced signal processing section processes the reproduced data during the waiting time in the recording mode thereby to monitor the recorded signal.

In the apparatus for recording and reproducing a signal on the disc type recording medium in which data to be recorded is intermittently recorded, there is intermittent waiting time during the recording mode in which waiting time recording is not made. During this waiting time, reading of data is not performed excepting reading of address and, therefore, it is possible to reproduce data for monitoring recording by utilizing this waiting time. By monitoring recording in this manner, no extra reproducing head for the monitoring purpose is required. Therefore, a complex circuit design for monitoring recording can be avoided and hence a compact design of the apparatus can be realized. The increase in the manufacturing cost required for addition of the circuit function according to the invention is much smaller than the increase in the manufacturing cost required for the provision of an additional reproducing head and its peripheral circuit.

For achieving the above described second object of the invention, in the apparatus, the recording means comprises a recorded signal processing section for processing the data to be recorded and the reproduction means comprises a reproduced signal processing section for processing the reproduced data, said recorded signal processing section comprises a recording memory for temporarily storing the data to be recorded on the disc and said reproduced signal processing section comprises a reproducing memory for temporarily storing the reproduced data read from the disc, and recording by the recording means and reproduction by the reproduction means are performed by performing writing in and reading from the recording memory and the reproducing memory alternately within a range allowed by the capacities of the respective memories.

In one aspect of the invention, the writing by said recording means is made at an address which is the same as or in a predetermined relation with an address at which the reproduced data has been read out.

In one aspect of the invention, the apparatus further comprises recorded data selection means for selecting, as the data to be recorded by the recording means, one of the reproduced data reproduced by the reproduction means, new data supplied from outside and synthesized data of these data.

In the apparatus for recording and reproducing a signal on a disc type recording medium in which data to be recorded is recorded intermittently in the recording mode and reproduced data is read out intermittently during the reproduction mode, all time of the reproduction mode is not used for reading of data but there is intermittently provided waiting time. During this waiting time, data reading is not performed excepting reading of address and, therefore, it is possible to make recording during this waiting time. Particularly, since recording is also made intermittently, by setting an editing mode in which the reproduction mode and the recording mode are repeated alternately, a reproduction operation can be made during waiting time in the recording mode and a recording operation can be made during waiting time in the reproduction mode within a range of capacities of the respective memories.

By this arrangement, an optical head for reproduction only is not required and so a complex circuit design can be avoided and the increase in the manufacturing cost required for addition of the circuit according to the invention is much smaller than the addition of a head for reproduction only and its peripheral circuit. Moreover, by designating an address of reproduced data as next recording address, editing in real time can be achieved on the same disc. Further, by performing editing by the recorded signal selection section, it is not necessary to take out reproduced data for editing so that an external mixer can be obviated.

For achieving the above described third object of the invention, in the apparatus, the recording means comprises first and second recorded signal processing sections for processing respectively first and second data to be recorded and the reproduction means comprises first and second reproduced signal processing sections for processing respectively first and second reproduced data, said disc comprises a first area in which recording processing by said first recorded signal processing section and reproduction processing by said first reproduced signal processing section are made and a second area in which recording processing by said second recorded signal processing section and reproduction processing by said second reproduced signal processing section are made, and the recording processing and reproduction processing by said first recorded signal processing section and said first reproduced signal processing section and the recording processing and reproduction processing by said second recorded signal processing section and said second reproduced signal processing section are performed alternately in the first and second areas of said disc.

In one aspect of the invention, this apparatus further comprises means for recording the first and second data to be recorded on said disc while maintaining different addresses at which the first and second data are to be recorded and synchronizing recording of the first and second data.

According to the invention, the two systems of signal processing sections are provided in one apparatus and, while the first signal processing section performs recording or reproducing operation at one address of a disc, the second signal processing section performs recording or reproduction operation at a different address of the same disc by utilizing waiting time of the disc. This arrangement is possible without changing the standard format of a standardized disc such as an MD.

There are four combinations of the recording and reproduction operations of the two signal processing systems. By adopting a combination in which all operations are performed in the same mode, recording or reproduction of signals of two channels each in each of the two signal processing systems, totalling signals of four channels, can be achieved by using a pair of recording and reproducing heads.

Assuming that the first data to be recorded is data of the first and second channels and the second data to be recorded is data of the third and fourth channels, the data to be recorded becomes four-channel data by synchronizing the data of the first and second channels with the data of the third and fourth channels. In this case, by providing a constant difference between write address of the first data to be recorded and write address of the second data to be recorded, synchronization between the two data can be facilitated.

For performing the recording and reproduction processing by the first and second signal processing sections alternately, a high rate jump is required for switching the address frequently. In this case, by calculating difference between a target number of tracks to be jumped and the number of actually jumped tracks, correction can be made to absorb deviation in the track pitch and linear velocity. Additionally, by utilizing the number of actually jumped tracks for the target number of tracks of return, prompt focusing to the target track, i.e., a high rate search, can be realized.

For achieving the above described fourth object of the invention, the apparatus further comprises disc drive means for reproducing data from a disc which is different from a write disc in which data is to be recorded, and head means which is driven to reproduce data from this different disc and, during waiting time in reproducing data from this different disc, is driven to record the reproduced data in the write disc, said head means being moved between the write disc and the different disc to perform recording and reproduction alternately.

According to the invention, by moving the head means between the recording disc and reproducing disc to perform recording and reproduction alternately, only a pair of magnetic head and optical head will be required for dubbing data from the reproducing disc to the recording disc and the necessity for providing a double deck is obviated. Particularly, since only one optical pick-up suffices, the complex and expensive circuit design can be avoided.

In the recording and reproducing type MD in which recording and reproduction are made intermittently, preparation for reproduction can be made during waiting time in the recording mode and preparation for recording can be made during waiting time in the reproduction mode and, therefore, dubbing substantially in real time can be realized and monitoring of reproduced data can be simultaneously realized.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
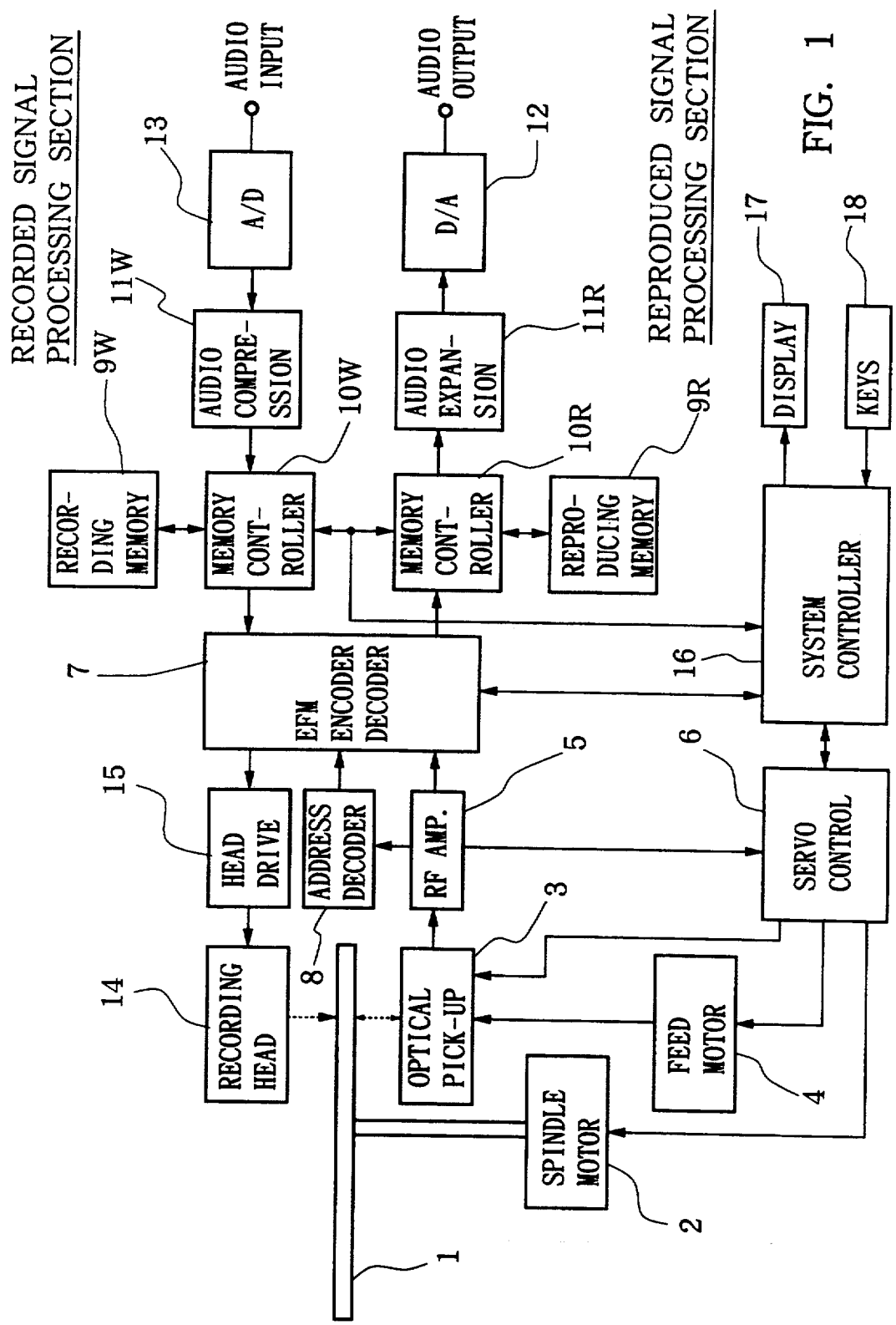
FIG. 1 is a block diagram showing an embodiment of the invention.
Figure 2:
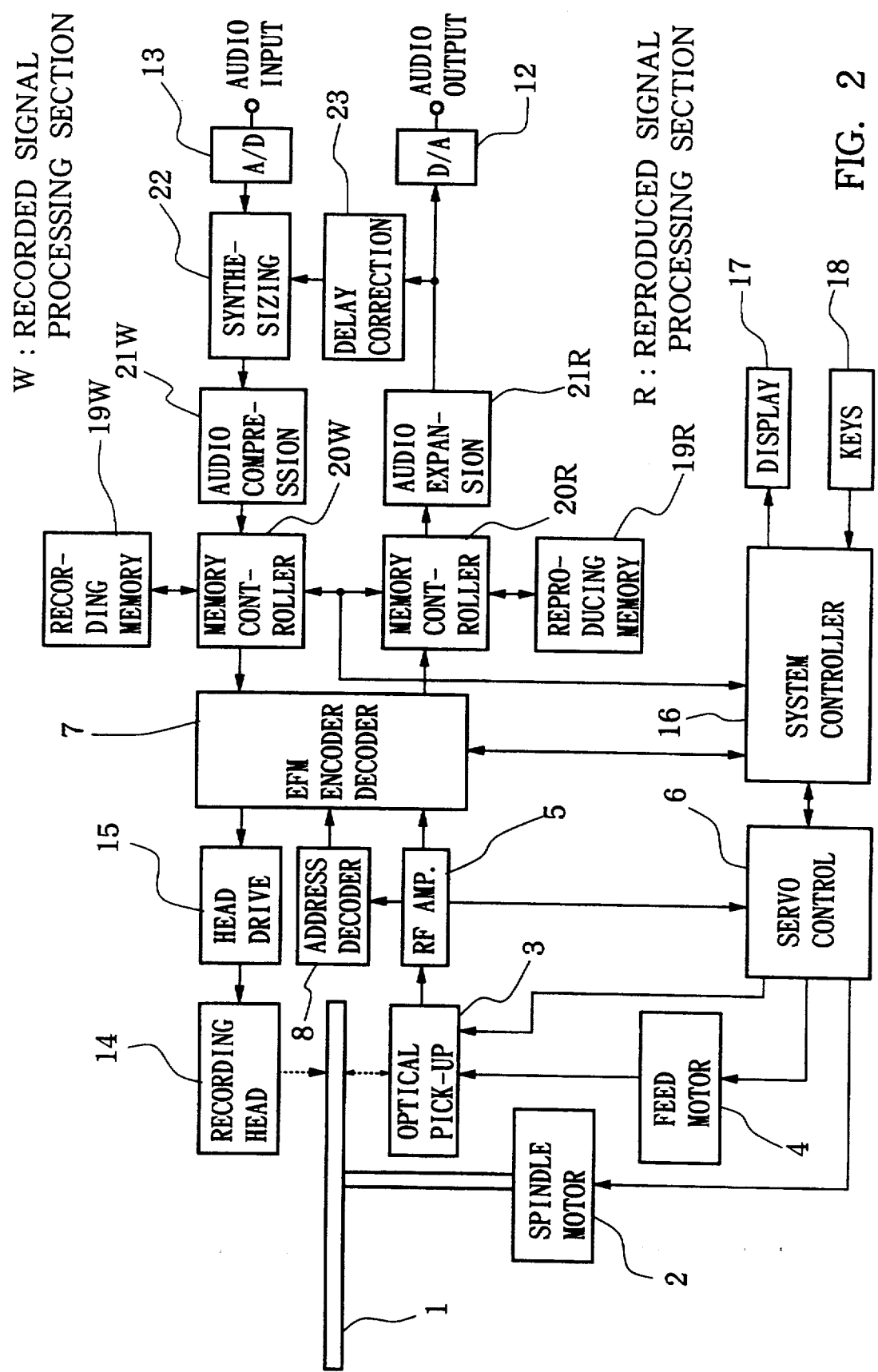
FIG. 2 is a block diagram showing another embodiment of the invention.
Figure 20:
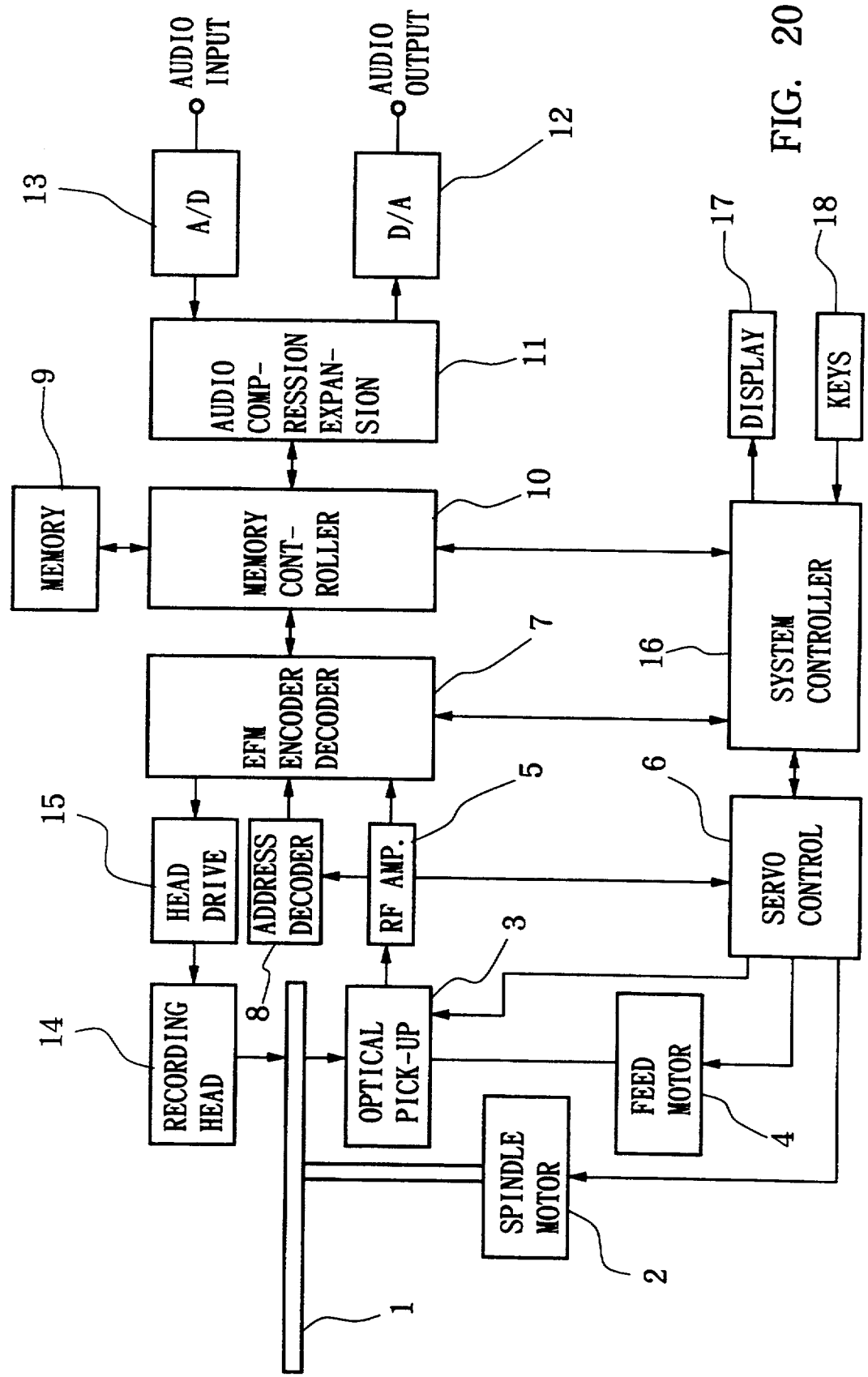
FIG. 20 is a block diagram showing an example of a basic MD recording and reproducing device.
Figure 21:
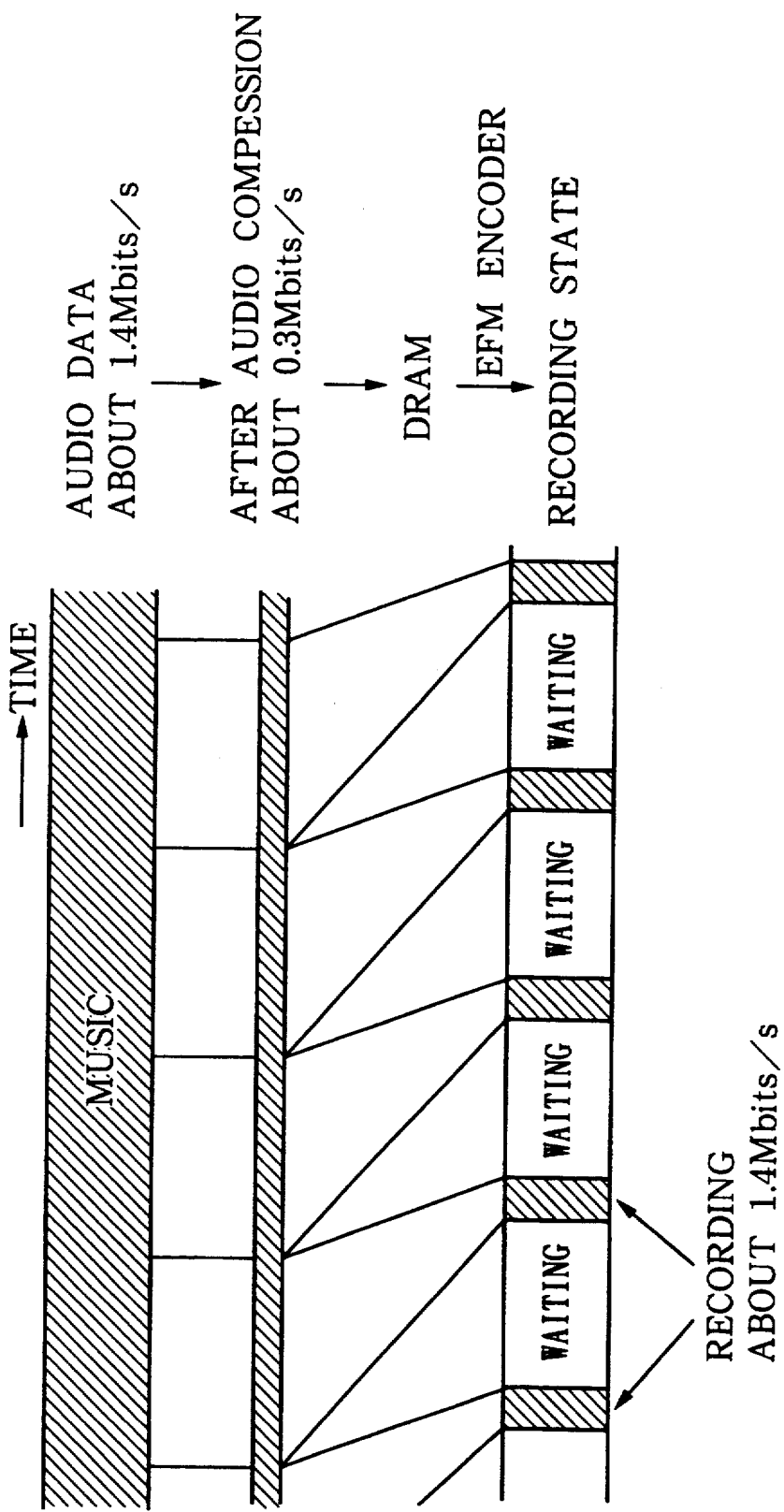
FIG. 21 is a graph for explaining intermittent writing in an MD.

Referring to FIGS. 1, 20 and 21, an embodiment of the invention achieving the above described first object of the invention will be described.

FIG. 20 shows a basic MD type disc recording and reproducing device. In FIG. 20, reference character 1 designates a disc, 2 a spindle motor for rotating this disc 1 at a constant linear velocity, 3 an optical pick-up for optically reading information from the disc 1 or magneto-optically writing information on the disc 1, 4 a feed motor for moving this pick-up 3 in the radial direction of the disc 1, 5 a high frequency (RF) amplifier for amplifying the output of the pick-up 3 and 6 a servo control section for peforming a rotation control for the spindle motor 2, a feed control for the feed motor 4 and a focus tracking control for the pick-up 3.

The disc 1 is either a reproduction only MD which is capable of reproduction only or a recording and reproduction MD which is capable of both reproduction and recording. The optical pick-up 3 has, as to the reproduction only MD, a function of reading information from the reproduction only MD using an optical disc by detecting the magnitude of reflected laser beam and, as to the recording and reproduction MD, a function of reading information from the recording and reproduction MD using a magneto-optical disc by detecting the difference in a rotational angle and a function of writing information on the recording and reproduction MD in a magneto-optical manner.

A reading system of this MD player includes a decoder section of an encoder/decoder 7 for decoding the output of the amplifier 5, an address decoder 8 for detecting an address being reproduced from the output of the amplifier 5, a memory 9 for temporarily storing the decoder output of the encoder/decoder 7, a controller 10 for the memory 9, an expansion section of an audio compression/expansion circuit 11 for expanding the output of the memory 9, and a digital-to-analog converter 12 for converting the expansion output of the compresson/expansion circuit 11 to an analog signal.

The encoder/decoder 7 adopts EFM (eight to fourteen modulation) as its modulation system and CIRC (cross interleave Reed-Solomon code) as its error correction system.

A writing system of this MD player includes an analog-to-digital conversion section 13 for converting an analog signal to a digital signal, a compression section of the audio compression/expansion circuit 11 for compressing the converted digital signal for removing an unnecessary component for reproduction of an audio signal from the digital signal, the memory 9 for temporarily storing compressed signal and the controller 10 for the memory 9, an encoder section of the decoder/encoder 7 for encoding the output of the memory 9, a recording head (magnetic head) 14 for writing the encoded signal on the disc 1, and a head drive circuit 15 for driving the recording head 14.

There are also provided a system controller 16 which controls the entire MD player, a display 17 which displays various information and operation keys 18 which impart various instructions.

The above described MD player includes a Compact Disc player as its basic component and additionally includes other functions such as an audio compression technique, a vibration-proof technique and a user recording function.

The audio compression performed by the audio compression/expansion circuit 11 is made by thinning out unnecessary data by utilizing human hearing characteristics. In a compression technique called ATRAC (Adaptive Transform Acoustic Coding), about five-fold data compression can be realized by utilizing the minimum human hearing characteristic and the masking effect.

The expansion section which restores the compressed data regenerates a digital waveform successively by synthesizing the decoded output of the encoder/decoder 7. By this system, a signal may be created having an equal quality to a signal having level changes of 16-bit stages and a sampling frequency of 44.1 kHz.

For performing this data compression and expansion, the buffer memory 9 having a corresponding capacity is required in the signal processing circuit.

One feature which improves portability of an MD player is a vibration-proof technique against "skipping of sound". This is realized in this embodiment by utilizing the difference between the reading rate of the pick-up 3 and the transfer rate of data input to the audio compression/expansion circuit 11 and utilizing the memory 9 as a data buffer. More specifically, the reading rate of the pick-up 3 is a high rate of 1.4 Mb (megabit)/sec. whereas the transfer speed of data input to the audio compression/expansion circuit 11 is a low rate of 0.3 Mb/sec. By using the memory 9 having the capacity of, e.g., 1M bit, data for about 3 seconds can be stored. Hence, even when reading from the disc 1 has stopped due to vibration, skipping of sound does not occur in a reproduced audio output if reading from the disc 1 is resumed within 3 seconds.

The memory 9 can be used also for writing. In this case, the compressed data provided from the audio compression/expansion circuit 11 at the rate of 0.3 Mb/sec. is stored temporarily in the memory 9 and then read from the memory 9 and transferred to the encoder/decoder 7 at the reading rate of 1.4 Mb/sec. Since writing on the disc 1 by the recording head 14 is made at 1.4 Mb/sec., this writing is intermittent writing using only a part of the total processing time.

The advantage of using the recording and reproduction MD as the disc 1 is that the disc 1 is writable. For writing information, the magnetic recording head 14 and laser beam of the optical pick-up 3 are used. As the writing system, there is used the magnetic field modulation system according to which laser beam of a constant laser beam strength is irradiated on the lower surface of the disc 1 and magnetic field modulated by written data is applied from the upper surface of the disc 1.

FIG. 21 shows the intermittent writing. In this graph, the horizontal axis indicates time base and the vertical axis indicates the flow of processing. The uppermost stage shows audio data of the transfer rate of 1.4 Mb/sec. which has been converted to digital data by the analog-to-digital converter 13. By compressing this data by the audio compressor 11, the data becomes compressed data of the transfer rate of 0.3 Mb/sec. shown in the middle stage. This compressed data is supplied through the DRAM 9 and the EFM encoder 7 to the magnetic head 14 (illustration of the head drive circuit is omitted) and is written on the disc 1 at a rate of 1.4 Mb/sec. if converted to audio data. Therefore, there is waiting time which is longer than single writing time between respective writing operations.

In a case where the magnetic field modulation system is employed for writing, only a portion of the disc 1 on which laser beam is irradiated by the optical pick-up 3 is magnetized by the magnetic field inversion operation of the magnetic head 14 whereby information in the form of "1" or "0" is written. The recording density in this case is determined by the performance of the optical pick-up 3. In the case of the same optical constants as the Compact Disc, the above described writing transfer rate becomes 1.4 Mb/sec. if converted to audio data.

The amount of writing and waiting time during one cycle are determined by the system design and the waiting time is always provided whatever system design is adopted. The invention utilized this waiting time for writing TOC information.

Referring now to FIG. 1, the apparatus according to this embodiment is based on the circuit of FIG. 20 and additionally includes the following improvements: That is, there are independently provided a recorded signal processing section including an analog-to-digital converter 13, an audio compression section 11W, a recording memory 9W and a recording memory controller 10W, and a reproduced signal processing section including a reproducing memory 9R, a reproducing memory controller 10R, an audio expansion section 11R and a digital-to-analog converter 12 and these sections are operated by a common master clock. The other component parts are designated by the same reference characters as those in FIG. 20 and description thereof will be omitted.

The recording memory 9W is used for temporarily storing recorded data which has been compressed by the audio compression section 11W. The reproducing memory 9R is used for temporarily storing reproduced data which has been decoded by an EFM encoder/decoder 7. Since the memory controllers 10W and 10R are independently provided for the memories 9W and 9R, reading and writing for the memories 9W and 9R can be made independently from each other.

When a reproduction mode is set by the operation keys 18, data reproduction is made by using the optical pick-up 3 and the reproduced signal processing section. When a recording mode is set by the operation key 18, data recording is made by using the optical pick-up 3 and the recorded signal processing section. During this mode, data reproduction for the monitoring purpose according to the invention is performed.

The recording mode used in the present invention will be described more in detail. As described previously, in a normal MD player, the ratio of the bit rate (0.3 Mb/sec.) of compressed data to be recorded and the bit rate of recording on the disc 1 (1.4 Mb/sec.) is about 1:5. Accordingly, the waiting time shown in FIG. 21 amounts to 4/5 of the entire time of the recording mode. Likewise, in the reproduction mode, 4/5 of the entire time of the reproduction mode is waiting time of the reproduction mode is waiting time during which no reproduction of a signal from the disc is made. Therefore, by accessing the disc 1 alternately by utilizing the waiting time in the respective modes, it is possible to realize recording and reproduction during the recording mode.

The recorded signal processing section and the reproduction signal processing section provided independently from each other enable instantaneous monitoring during the recording mode. When the recording mode is set, compressed data provided by the audio compression section 11W is successively accumulated in the recording memory 9W by the recording memory 9W under the control by the recording memory controller 10W. During this time, the system controller 16 controls the servo control section 6 to move the recording head 14 and the optical pick-up 3 to a write address of the disc 1. In this state, the memory controller 10W causes data of a predetermined amount to a posterior circuit and, therefore, this data is recorded at the write address of the disc 1. As described previously, the recording head 14 and the optical pick-up 3 are used for writing of the data.

Upon completion of one data recording operation, a stand-by-state in the recording mode is brought about in a conventional apparatus. In the present invention, reading of data for the monitoring purpose is made during this waiting time. More specifically, upon completion of recording, the system controller 16 controls servo control section 6 to move a set of the recording head 14 and the optical pick-up 3 to a read address of the disc 1. This read address is a write address of lastly recorded data. The signal reproduced from the disc 1 at this time is decoded by the encoder/decoder 7 and successively accumulated in the reproducing memory 9R under the control of the memory controller 10R. The compressed data read from the memory 9R is expanded by the audio expansion section 11R and thereafter is converted to analog data by the digital-to-analog converter 12. Subsequently, the above described recording and reproduction are repeated and the instantaneous monitoring of recording during the recording mode can be achieved.

Referring now to FIGS. 2 to 7, an embodiment for achieving the second object of the invention will now be described. The apparatus according to this embodiment is based on the circuit of FIG. 20 and additionally includes the following improvement: That is, (1) there are independently provided a recorded signal processing section W including an analog-to-digital converter 13, an audio compression section 21W, a recording memory 19W (e.g., DRAM of 4M bits) and a recording memory controller 20W, and a reproduced signal processing section R including a reproducing memory 19R (e.g., DRAM of 4M bits), a reproducing memory controller 20R, an audio expansion section 21R and a digital-to-analog converter 12 and these sections are operated by a common master clock; (2) there are provided a synthesizing circuit 22 for synthesizing, switching and selecting the output of the audio compression section 21R and the output of the analog-to-digital converter 13 as desired and a delay correction circuit 23 for correcting, during synthesizing of the data, delay caused by conversion time in the analog-to-digital converter 13; and (3) an editing mode control is made so that the recording mode and the reproduction mode are repeated alternately. The other component parts are designated by the same reference characters as those in FIG. 20 and description thereof will be omitted.

The recording memory 19W is used for temporarily storing recorded data which has been compressed by the audio compression section 21W. The reproducing memory 19R is used for temporarily storing reproduced data which has been decoded by an EFM encoder/decoder 7. Since the memory controllers 20W and 20R are independently provided for the memories 19W and 19R, reading and writing for the memories 19W and 19R can be made independently from each other.

When a reproduction mode is set by operation keys 18, data reproduction is made by using the optical pick-up 3 and the reproduced signal processing section R. When a recording mode is set by the operation keys 18, data recording is made by using the optical pick-up 3 and the recorded signal processing section W. When an editing mode is set by the operation keys 18, the editing operation in which recording and reproduction are alternately made on the same disc 1 is performed.

The editing mode used in the present invention will be described more in detail. As described previously, in a normal MD player, the ratio of the bit rate (0.3 Mb/sec.) of compressed data to be recorded and the bit rate of recording on the disc 1 (1.4 Mb/sec.) is about 1:5. Accordingly, the waiting time shown in FIG. 21 amounts to 4/5 of the entire time of the recording mode. Likewise, in the reproduction mode, 4/5 of the entire time of the reproduction mode is waiting time during which no reproduction of a signal from the disc 1 is made. Therefore, by accessing the disc 1 alternately by utilizing the waiting time in the respective modes, it is possible to realize recording and reproduction alternately.

The recorded signal processing section W, reproduced signal processing section R, controller 16 and synthesizing circuit 22 enable the operation in the editing mode.

In the reproduction operation during the editing mode, the system controller 16 controls the servo control section 16 to move the recording head 14 and the optical head 3 together to a read address of the disc 1. At this time, a signal read from the disc 1 is decoded by the encoder/decoder 7 and successively accumulated in the reproducing memory 19R under the control by the memory controller 20R. The compressed data read from the memory 19R is expanded by the audio expansion section 21R and thereafter is converted to analog data by the digital-to-analog concerter 12 and also is applied to the synthesizing circuit 22 through the delay correction circuit 23.

Upon completion of one data reproduction operation, a standby state in the reproduction mode is brought about in a conventional player. In this embodiment, writing of editing data is made during this waiting time. More specifically, in the recording operation during the editing mode, compressed data obtained by compressing the output of the synthesizing circuit 22 by the audio compression section 21W is successively accumulated in the recording memory 19W under the control by the system controller 16. At this time, the system controller 16 controls the servo control section 6 to move the recording head 14 and the optical pick-up 3 to a write address of the disc 1. In this state, the memory controller 20W causes data of a predetermined amount to be read from the recording memory 19W and transferred to a posterior circuit, thereby causing this data to be recorded at the write address of the disc 1.

Subsequently, by repeating recording and reading in the same manner, editing in real time according to which a desired processing is made on reproduced data is realized. In the example shown in FIG. 3, editing data (i.e., a synthesized music signal) based on reproduced data (i.e., a reproduced music signal) read from address areas n1, n2, n3, n4 . . . are overwritten at the same address areas n1, n2, n3, n4 . . . at a writing timing two timings later and this enables editing substantially in real time. The type of editing is determined by the structure of the synthesizing circuit 22.

Figure 4:
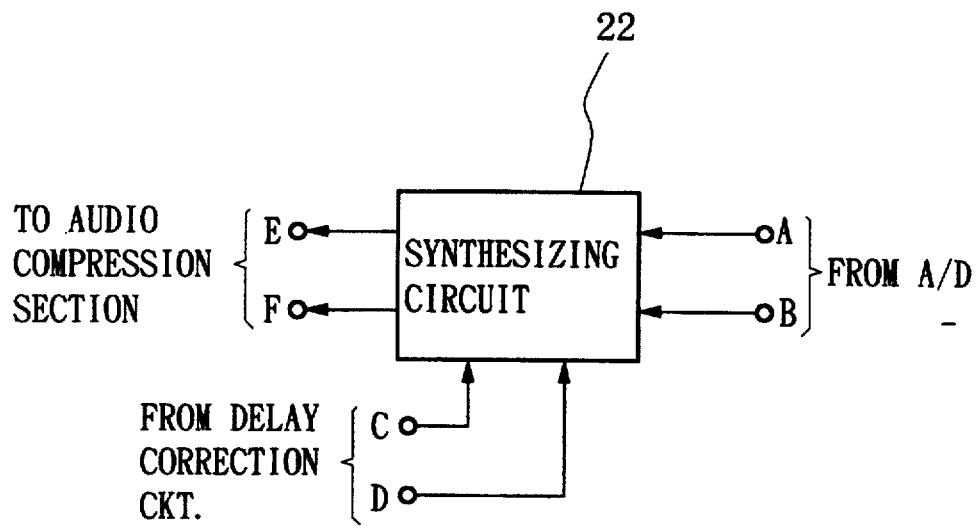
FIG. 4 is a block diagram showing an example of a synthesizing circuit.
Figure 5:
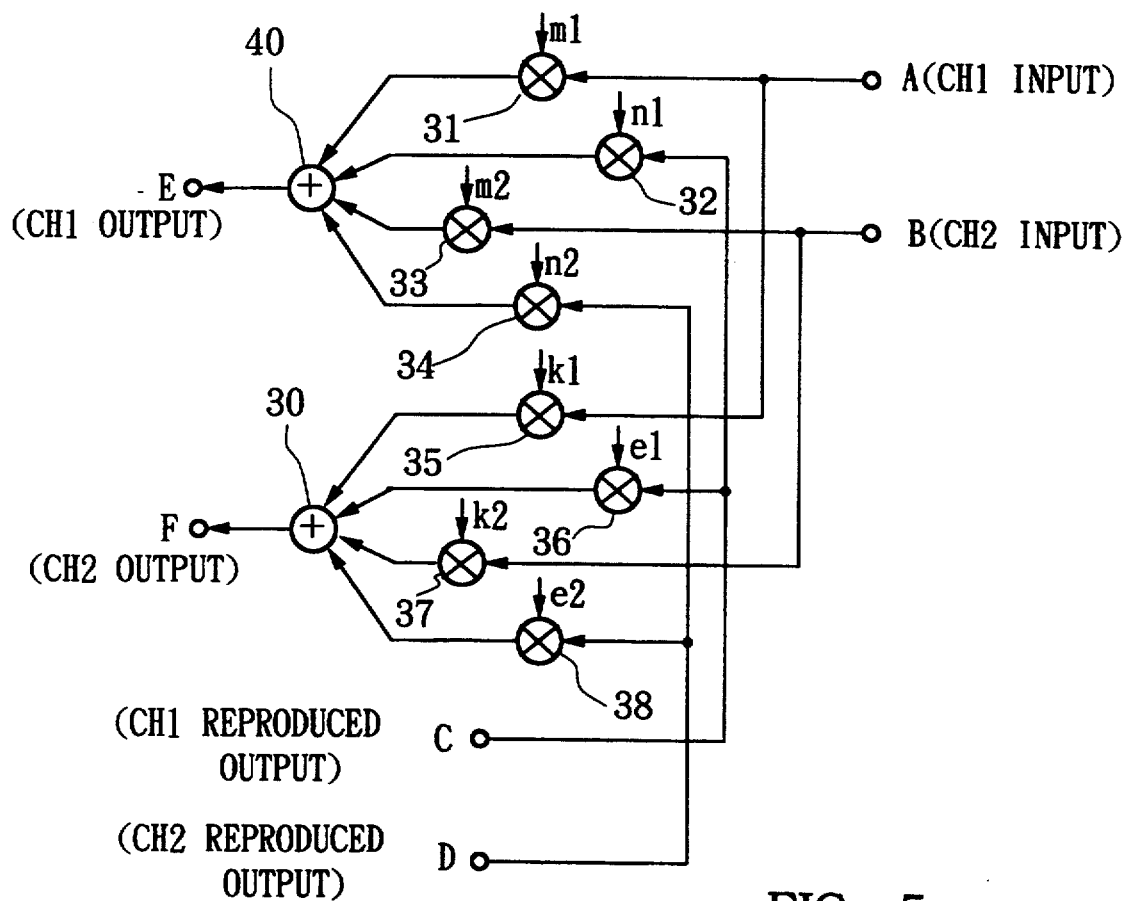
FIG. 5 is a circuit diagram showing a specific example of the synthesizing circuit.

FIG. 4 shows an example of the synthesizing circuit 22 in which two channel new data A and B applied from out side and two channel reproduced data C and D read from the disc 1 are synthesized together to produce two channel edited data E and F to be recorded. This synthesizing circuit 22 is specifically constructed, for example, as shown in FIG. 5. In the circuit of FIG. 5, multipliers 31, 32, 33 and 34 multiply data A, B, C and D with coefficients m1, n1, m2 and n2. Results of the multiplication are added together by an adder 40 to produce data E to be recorded. Multipliers 35, 36, 37 and 38 multiply data A, B, C and D with coefficients k1, e1, k2 and e2. Results of the multiplication are added together by an adder 30 to produce data F to be recorded.

Figure 6A:
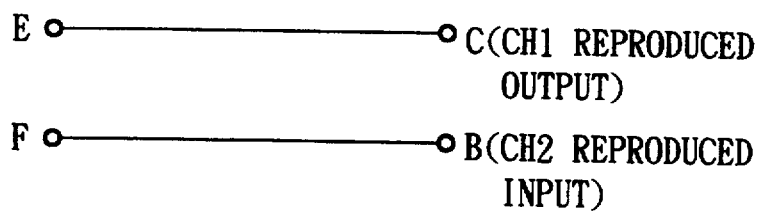
FIGS. 6A to 6C are diagrams showing the operation of the synthesizing circuit of FIG. 5.
Figure 6B:
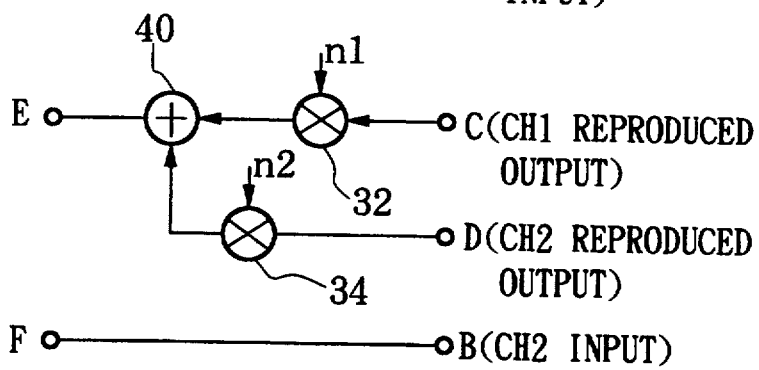
Figure 6C:
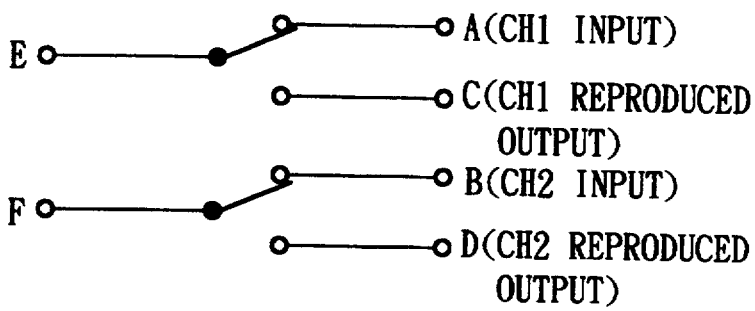

According to the synthesizing circuit of FIG. 5, selection, synthesizing and switching as shown in FIGS. 6A, 6B and 6C can be realized by suitably setting the respective multiplication coefficients between 1 (perfect ON) and 0 (perfect OFF).

In FIG. 6A, the relation E=C can be established by setting the coefficients at m1=m2=n2=0 and n1=1 and the relation F=B can be established by setting the coefficients at k1=e1=e2=0 and k2=1. This is an example of overdubbing in which, in synchronism with the reproduced data C in channel 1 (CH1), new data B is recorded in channel 2 (CH2).

FIG. 6B is an example in which the relation F=B is establised by setting the coefficients k1=e1=e2=0 and k2=1, and the relation E=n1·C+n2·D is established by setting the coefficients at m1=m2=0, n1=(any value between 1 and 0) and n2=(any value between 1 and 0). This is an example of the table tennis recording and overdubbing in which the reproduced data C and D in CH1 and CH2 are mixed together and recorded in CH1 and, in synchronism with this, new data B is recorded in CH2.

FIG. 6C is an example in which the relations E=A/C and F=B/D are established by setting the coefficients m2=n2=k1=e1=0. The switching of A/C is made by the multipliers 31 and 32 and the switching of B/D is made by the multipliers 37 and 38. By setting the coefficients at m1=1 and n1=0, E=A is established and by setting the coefficients conversely at m1=0 and n1=1, E=C is established. By setting the coefficients k2=1 and e2=0, F=B is established and by setting the coefficients conversely at k2=0 and e2=1, F=D is established. This is an example of the punch-in/punch-out in which data is reproduced from CH1 and CH2 and, in synchronism with it, the reproduced data is partially replaced by new data A and B.

Figure 3:
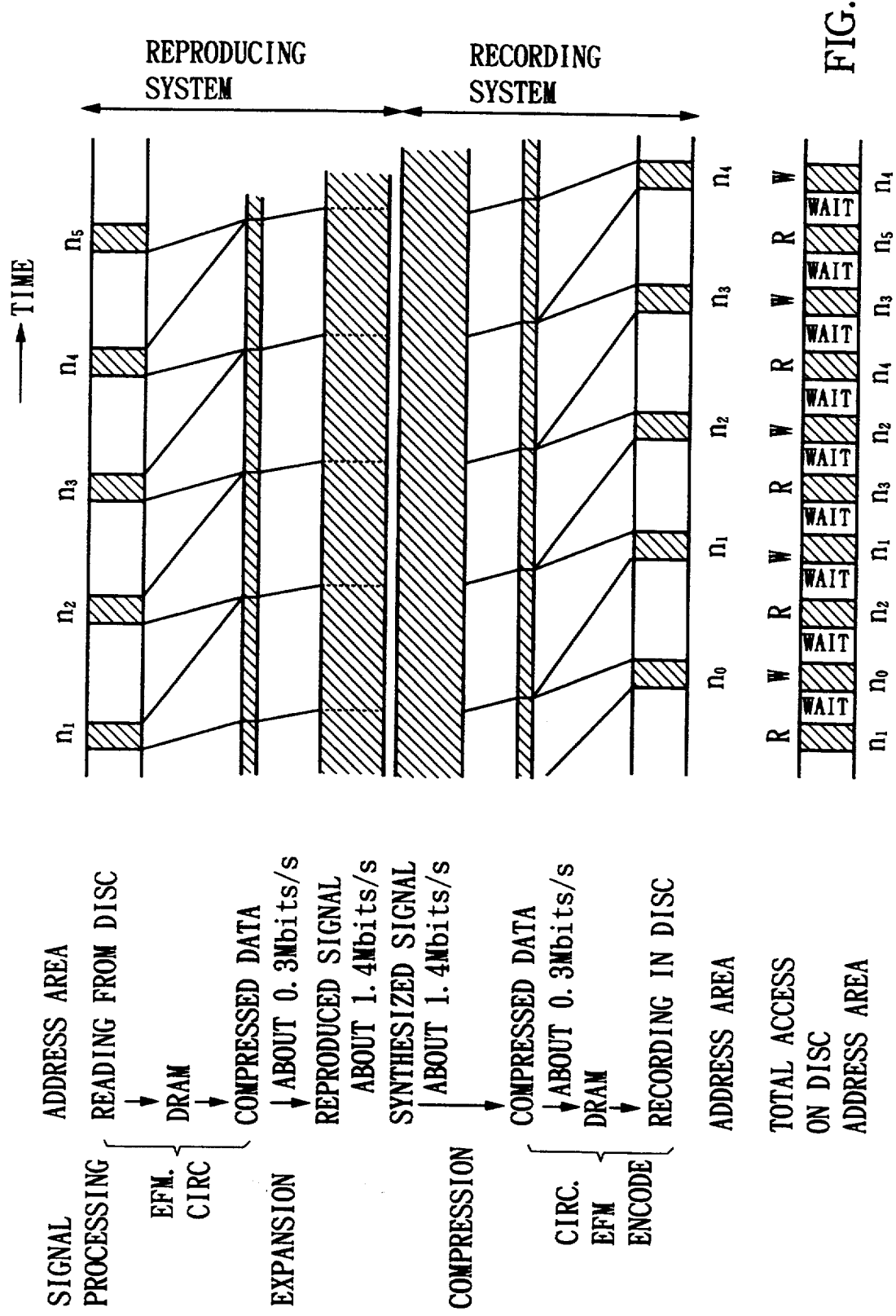
FIG. 3 is a graph for explaining the operation of the editing mode.

When the structure shown in FIGS. 4 to 6 is adopted, control of write address is made in the following manner: In the case the data is replaced in synchronism with the reproduced data, data is recorded at the same address as the reproduced data in the same manner as shown in FIG. 3. In the case of replacing the data by outside data also, address of the data which is being reproduced is referred to. In a case where outside data to be recorded is to be written at a different position, it is possible to use a relative address obtained by adding or subtracting a predetermined value to or from the address of reproduced data.

Figure 7:
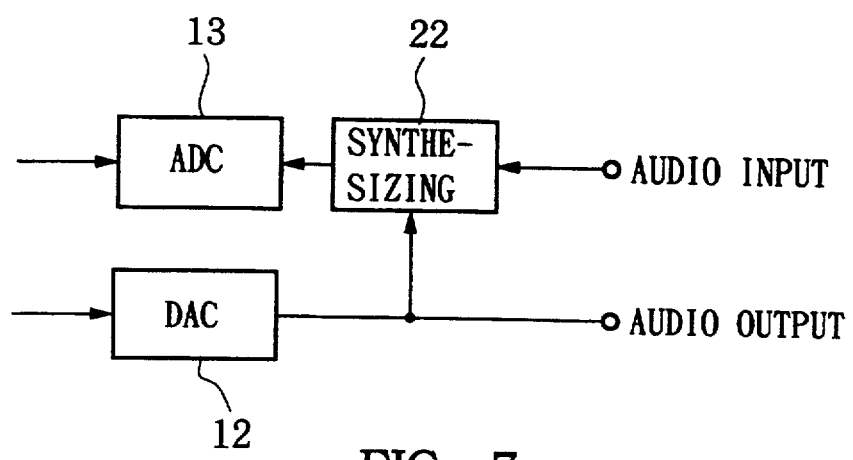
FIG. 7 is a block diagram showing an arrangement of an analog operation type synthesizing circuit.

In the foregoing description, the synthesizing circuit 22 is made of a digital operation type circuit. Alternatively, when an analog operation type circuit is used as the synthesizing circuit 22, an arrangement as shown in FIG. 7 may be adopted. In this arrangement, the output of the digital-to-analog converter 12 and audio input applied from outside are synthesized together by the synthesizing circut 22 and applied to the analog-to-digital converter 13.

The manner of editing is not limited to the example shown in FIGS. 6A to 6C.

Figure 8:
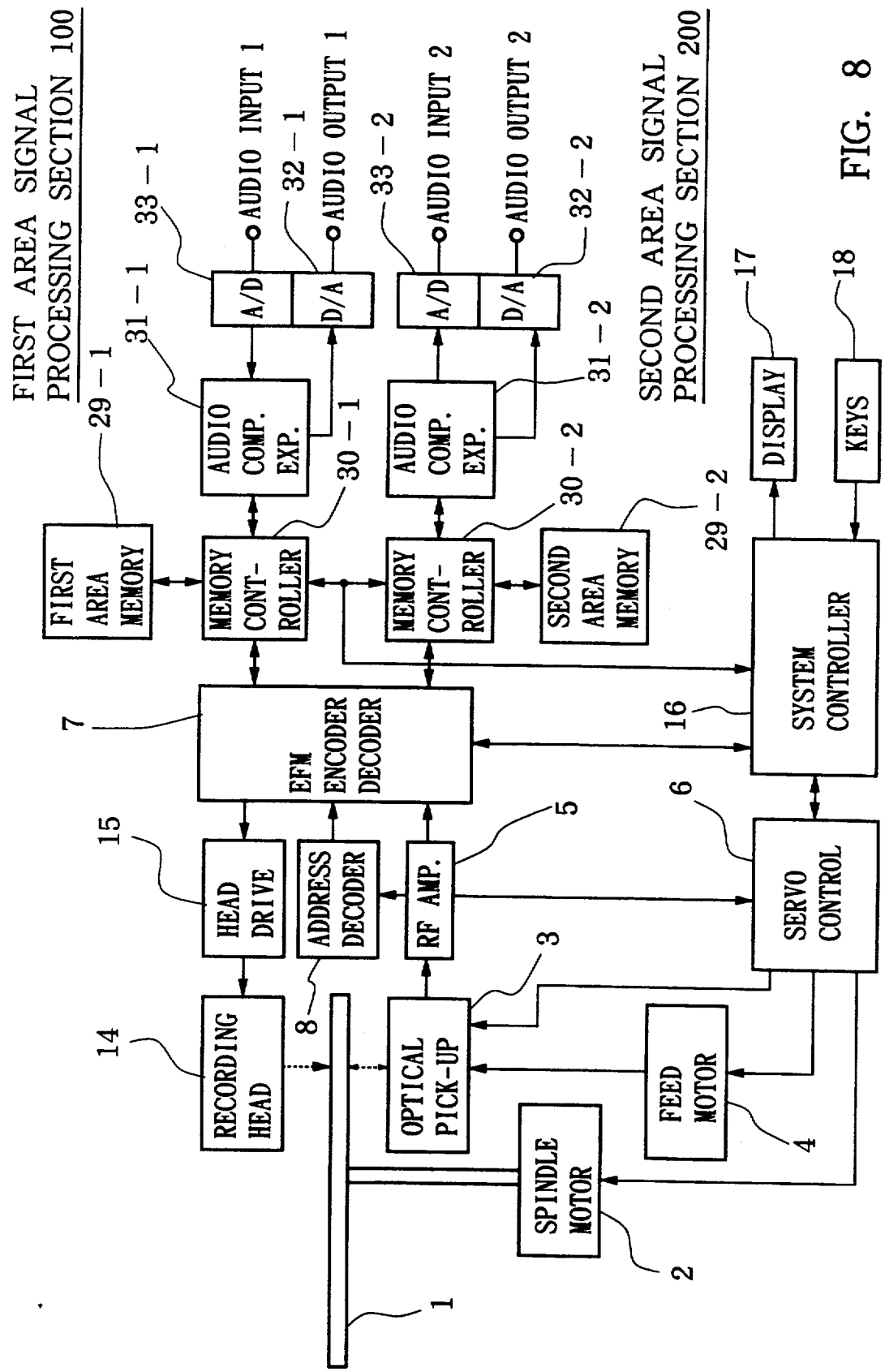
FIG. 8 is a block diagram showing another embodiment of the invention.

Referring now to FIGS. 8 to 13, an embodiment for achieving the third object of the invention will be described. In FIG. 8, the apparatus is based on the circuit shown in FIG. 20 and modified in the following manner: A signal processing section including an analog-to-digital converter 33-1, a digital-to-analog converter 32-1, an audio compression and expansion section 31-1, a first area memory 29-1 (e.g., DRAM of 4M bits) and a memory controller 30-1 is the same as the standard circuit shown in FIG. 20. This signal processing section is designated as a first area signal processing section 100. In this embodiment, there is provided, independently from this signal processing section 100, a second area signal processing section 200 including an analog-to-digital converter 33-2, a digital-to-analog converter 32-2, an audio compression and expansion section 31-2, a second area memory 29-2 (e.g., DRAM of 4M bits) and a memory controller 30-2. These signal processing sections 100 and 200 are operated with the same master clock. The other components which are the same as those in FIG. 20 are designated by the same reference characters and description thereof will be omitted.

The system controller 16 performs various controls in accordance with a program housed therein. First, the system controller 16 performs a control according to which the operation of the first area signal processing section 100 and the operation of the second area signal processing section 200 are repeated alternately by utilizing their respective waiting times. Secondly, the system controller 16 selects either the operation (recording 1, reproduction 1) by the signal processing section 100 or the operation (recording 2, reproduction 2) by the signal processing section 200 and sets one of four combinations of operations, i.e., recording 1-recording 2, recording 1-reproduction 2, reproduction 1-recording 2 and reproduction 1-reproduction 2). Thirdly, in a case where the combination of recording 1-recording 2 is carried out for a four-channel signal, the system controller 16 controls write address so that the signals of two channels each will be recorded in synchronism with each other. The same is the case with reproduction of a four-channel signal by the combination of reproduction 1-reproduction 2. Other controls by the system controller 16 will be described later.

Upon setting of a normal reproduction mode by operation of the operation key 18, reproduction of two-channel data is performed by using the optical pick-up 3, recording head 14 and one of the signal processing sections, e.g., the signal processing section 100. Also, upon setting of a normal recording mode by operation of the operation keys 18, recording of two-channel data is performed by using the optical pick-up 3, recording head 14 and signal processing section 100. On the other hand, upon setting a multiple operation mode by operation of the operation keys 18, the signal processing sections 100 and 200 are operated alternately to perform recording and reproduction of four-channel data, i.e., two-channel data and two-channel data.

Figure 9:
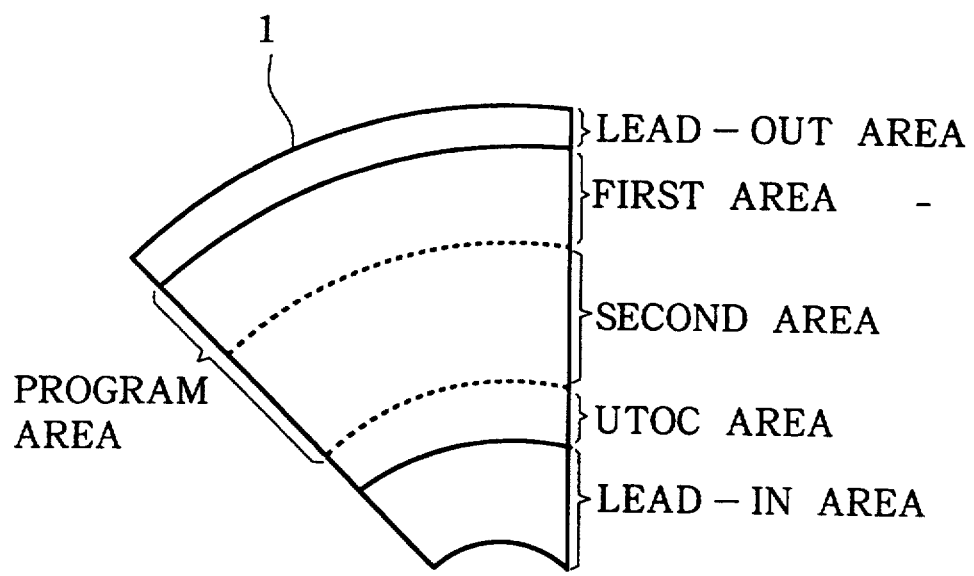
FIG. 9 is a diagram showing a first manner of program area division.
Figure 10:
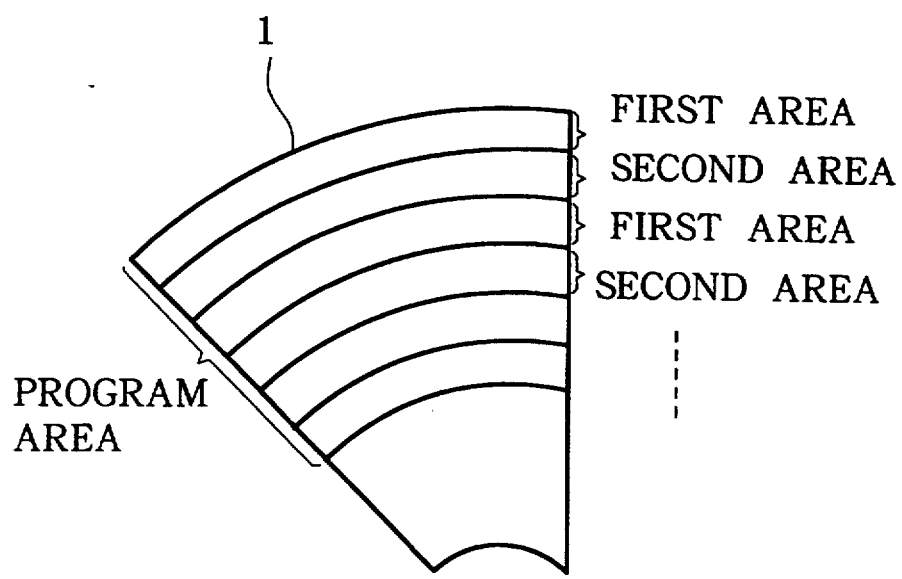
FIG. 10 is a diagram showing a second manner of program area division.

For enabling the operations of the multiple operation mode without changing the standard format of an MD, the program area of the disc 1 is radially divided into two areas as shown in FIG. 9 or divided repeatedly by several hundred tracks in the radial direction as shown in FIG. 10 to create the first area to which the first area signal processing section 100 accesses and the second area to which the second area signal processing section 200 accesses. This program area is an area left by excluding a lead-in area, an UTOC area and a lead-out area from information area which is effective as a area containing information on the disc 1. The UTOC area is a TOG (table of contents) area in which the user can overwrite data and this UTOC area and the program area constitute a recordable area in the disc 1.

Figure 11:
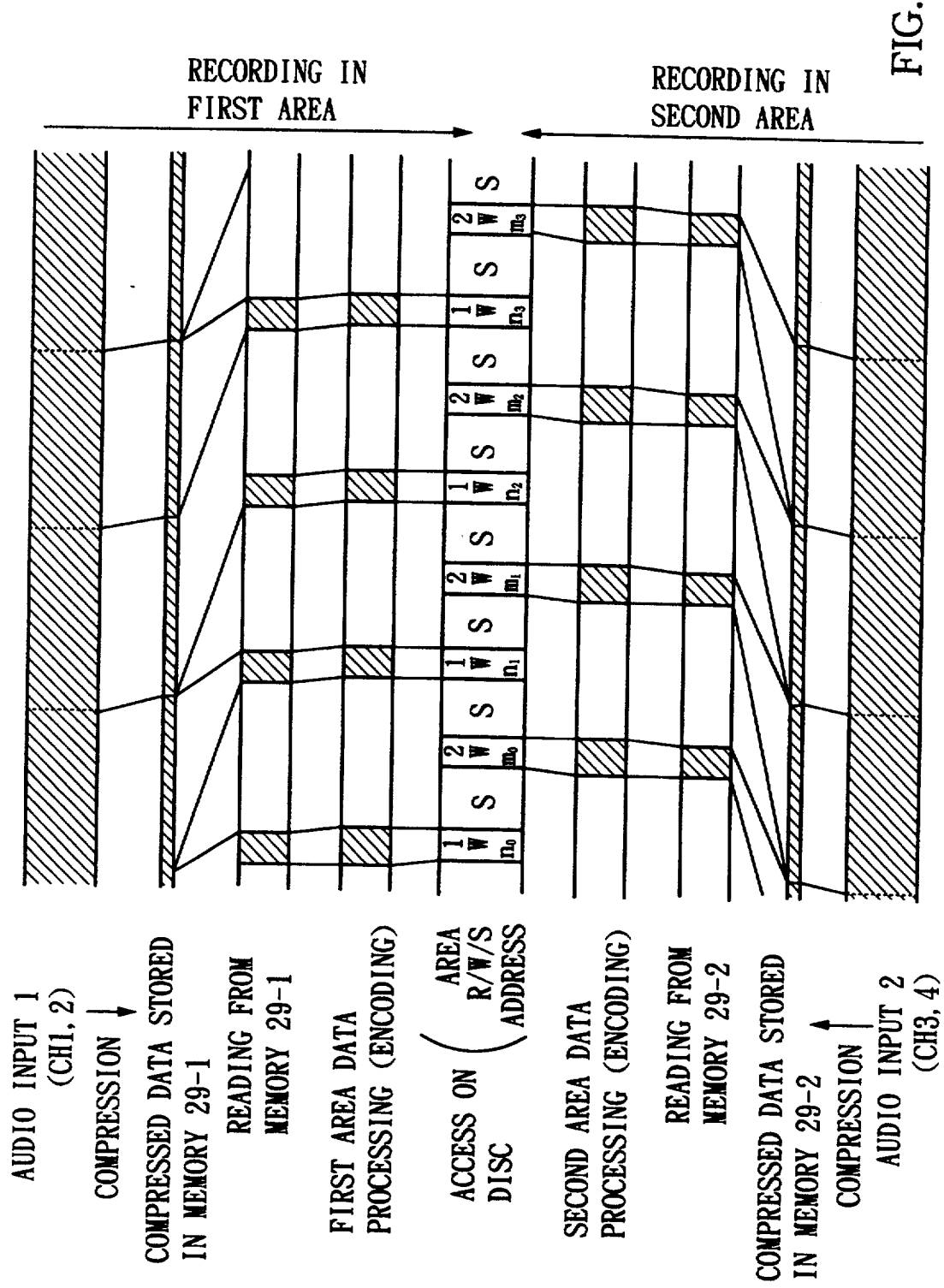
FIG. 11 is a graph for explaining the operation of a simultaneous recording-recording mode.

FIG. 11 illustrates the operation during recording of a four-channel signal during which recording in the first area and recording in the second area are performed alternately. As shown by the flow directed from the top to the middle of this figure, an audio input 1 (CH1, CH2) applied to the first area signal processing section 100 is analog-to-digital converted, compressed, accumulated and encoded and, thereafter, is written intermittently at addresses n0, n1, n2 .... of the program area 1 (i.e., the first area) of the disc 1. Upon completion of one writing (W) in the area 1, there comes waiting time before next writing. During this waiting time, search (S) for write address and writing (W) in the area 1 are made.

By repeating this alternate recording operation, four-channel data is recorded in the form of two-channel data plus two-channel data. Since, in this case, recording of the synchronously applied audio inputs 1 and 2 in the areas 1 and 2 of the disc 1 is made on a time shared basis, a control is required to delay reading of data from the memory 29-2 by time length by which recording in the second area is delayed from recording in the first area.

Figure 12:
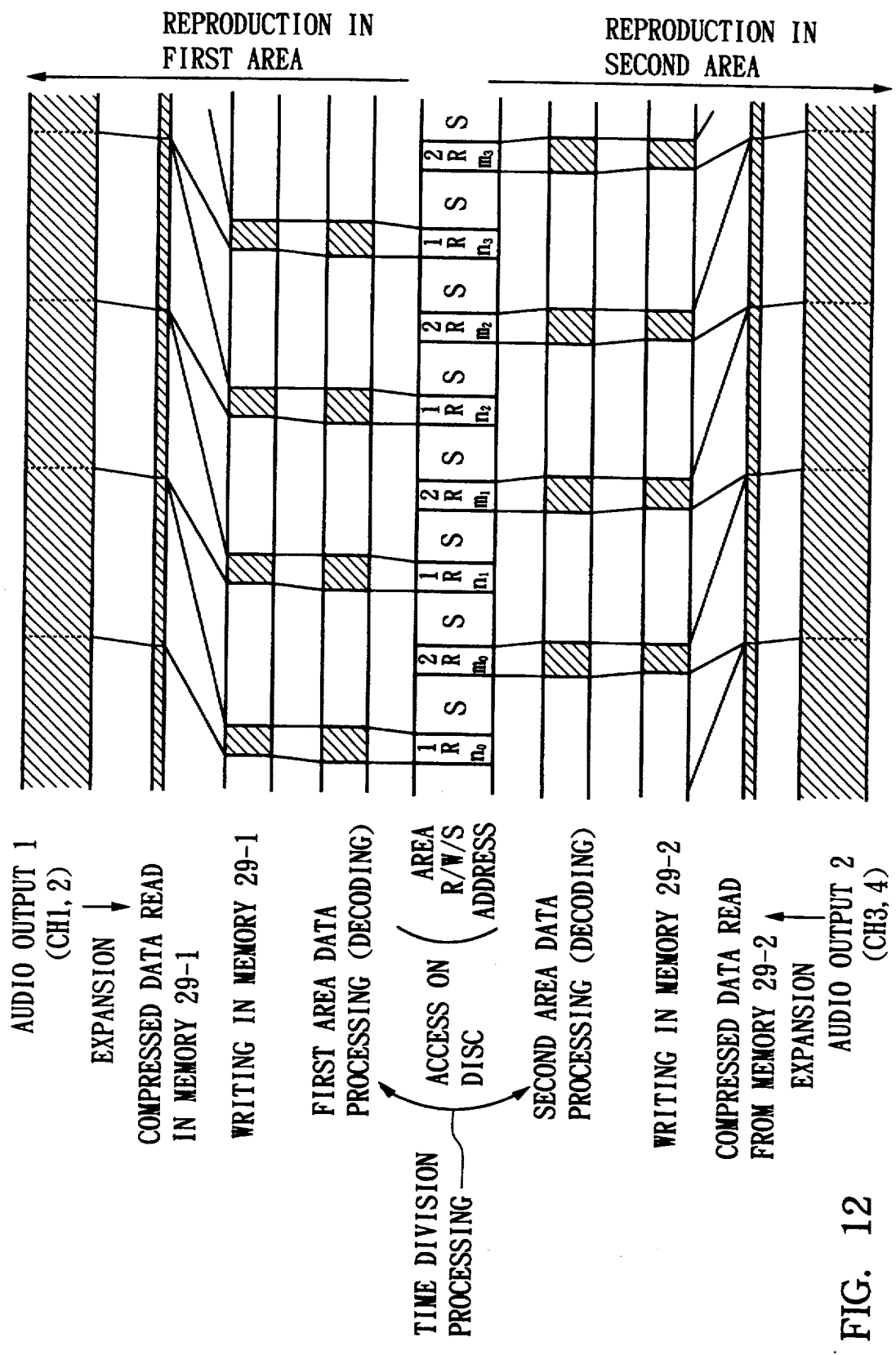
FIG. 12 is a graph for explaining the operation of a simultaneous reproduction-reproduction mode.

FIG. 12 illustrates the opration during reproduction of a four-channel signal during which reproduction in the first area and reproduction in the second area are performed alternately. As shown by the flow directed from the top to the middle of the figure, data reproduced intermittently from addresses n0, n1, n2 ... of the program area 1 of the disc 1 is decoded, accumulated, expanded and digital-to-analog converted and, thereafter, is provided as audio output 1 (CH1, CH2). Upon completion of one reading (R) from the area 1, there comes waiting time before next reading. During this waiting time, search (R) for read address and reading (S) in the area 2 are made.

As shown by the flow directed from the middle to the bottom of FIG. 12, data reproduced from addresses m0, m1, m2 ... of the program area 2 of the disc 1 is decoded, accumulated, expanded and digital-to-analog converted and, thereafter, is provided as audio output 2 (CH3, CH4). Upon completion of one reading (R) in the area 2, there comes waiting time before next reading. During this waiting time, search (S) for read address and reading (R) in the area 1 are performed.

By repeating the alternate reproduction operation, a four-channel signal is reproduced in the form of two-channel signal plus two-channel signal. In this case, a control is necessary for delaying reading of data from the memory 29-1 to synchronize the audio outputs of CH1 to CH4.

Figure 13:
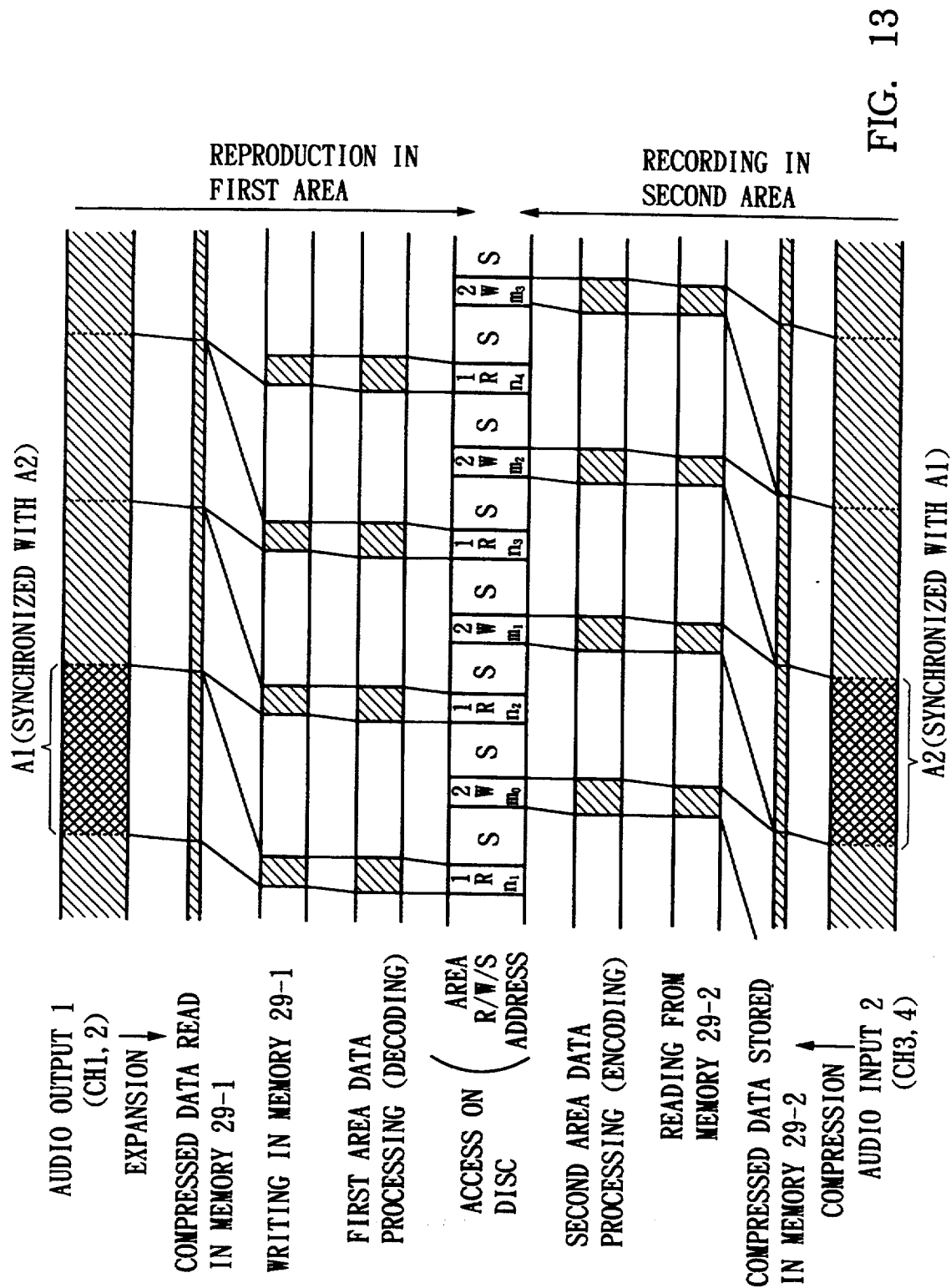
FIG. 13 is a graph for explaining the operation of a simultaneous reproduction-recording mode.

FIG. 13 illustrates the operation of two-channel reproduction and two-channel recording in which reproduction in the first area and recording in the second area (or vice versa) are made alternately. As shown by the flow directed from the bottom to the middle of this figure, audio input 2 (CH3, CH4) applied to the second area signal processing section 200 is analog-to-digital converted, compressed, accumulated and encoded and, thereafter, is written (W) intermittently at addresses m0, m1, m2 ... Upon completion of one writing operation (W), there comes waiting time before next writing. During this waiting time, search (S) for read address and reading (R) in the area 1 are performed.

As shown by the flow directed from the middle to the top of FIG. 13, data reproduced (R) intermittently from addresses n1, n2, n3 ... of the program area 1 of the disc 1 is decoded, accumulated, expanded, digital-to-analog converted and, thereafter, is provided as audio output 1 (CH1, CH2). Upon completion of one reading (R) in the area 1, there comes waiting time before next reading. During this waiting time, search (S) for write address and writing (W) in the area 2 are performed.

Subsequently, by repeating the alternate recording and reproduction operation, one two-channel data can be recorded (or reproduced) simultaneously while other two-channel data is reproduced (or recorded). In this case, a delay control is made during reading from the memory to synchronize timing of audio output A1 of the first area with timing of audio output A2 of the second area. Since the addresses n1 and m1, n2 and m2 ... in the disc 1 correspond to each other, there arises difference between timing of writing (W) and timing of reading (R). Since, however, a signal to be recorded and a signal to be reproduced are independent from each other, no particular difficulty arises from this difference in timing.

Some points to be considered in carrying out the above described operations and how to cope with them will be described below.

For matching the standards of an MD, the track number of the first area is set at, e.g., an odd number and the track number of the second area to an even number. That is, the recording and reproduction operations are controlled so that the track numbers (1, 2), (3, 4), (5, 6) ... are treated as the same program. By this arrangement, in a case where a disc on which four-channel data is recorded according to this invention is played back by an MD player of a normal standard, the same program is reproduced twice two-channel by two-channel and hence there is no problem. This is because the track number 1 is related to CH1 and CH2, the track number 2 to CH3 and CH4, the track number 3 to CH1, CH2 and the track number 4 to CH3 and CH4.

For increasing the speed of the search operation performed during waiting time between the two areas, two methods can be conceived. One is an area dividing method. As compared to the method of FIG. 9 in which the entire program area is divided into two areas, the method of FIG. 10 in which the program area is divided repeatedly into areas by several hundred tracks obviates feed motor for moving the entire optical pick-up 3 in the radial direction and instead can achieve the same purpose by a track jump in which the actuator for the objective lens provided in the optical pick-up 3 is rotated at a high speed by applying a kick pulse to the tracking coil. The track jump can achieve not only a higher speed but also a lighter mechanical load than the feed system. This advantage of the track jump becomes more distinct as the area is divided further within a range of linking points which can be stored in the UTOC area.

A second method for increasing the speed of the search operation is an address control. More specifically, difference between the start address in the first area and the start address in the second area is set at a predetermined value N and recording of data is made in such a manner that the address continues in each area. By this arrangement, difference between corresponding addresses in the two areas is maintained at a constant value so that an address after the track jump can be known before performing the track jump.

A third method is the above described address control added with the following jump control means. This jump control means includes (1) means for calculating (by ROM or arithmetic operation), on the basis of difference in the addresses, the number of tracks to be jumped between any address in the first area and an address corresponding thereto in the second area, (2) track jump control means (a normal tracking servo system can be utilized for this purpose) based on a numerical value obtained from the calculation means, (3) means for storing the number of actually jumped tracks between the first area and the second area (obtained by, e.g., counting the tracking error signal), (4) means for controlling a return track jump from the second area to the first area to the numerical value stored by the storing means of (3) or a value proximate to this numerical value (preferably in the direction of address change) and (5) means for calculating difference between the numerical value obtained by the calculating means of (1) and the numerical value stored by the storing means of (3) and thereby correcting the result of calculation by the calculation means of (1).

The means (4) obviates the calculation of the number of tracks in the return track jump and hence shortens time before start of jump. The means (5) absorbs deviation in the track pitch and linear velocity and hence expedites focusing (by the tracking servo) to a target track after jump. Accordingly, a high speed jump between the first area and the second area can be achieved by combining the above described area division, address control and jump control.

An embodiment for achieving the above described fourth object of the invention will be described with reference to FIGS. 14 to 17.

Figure 14:
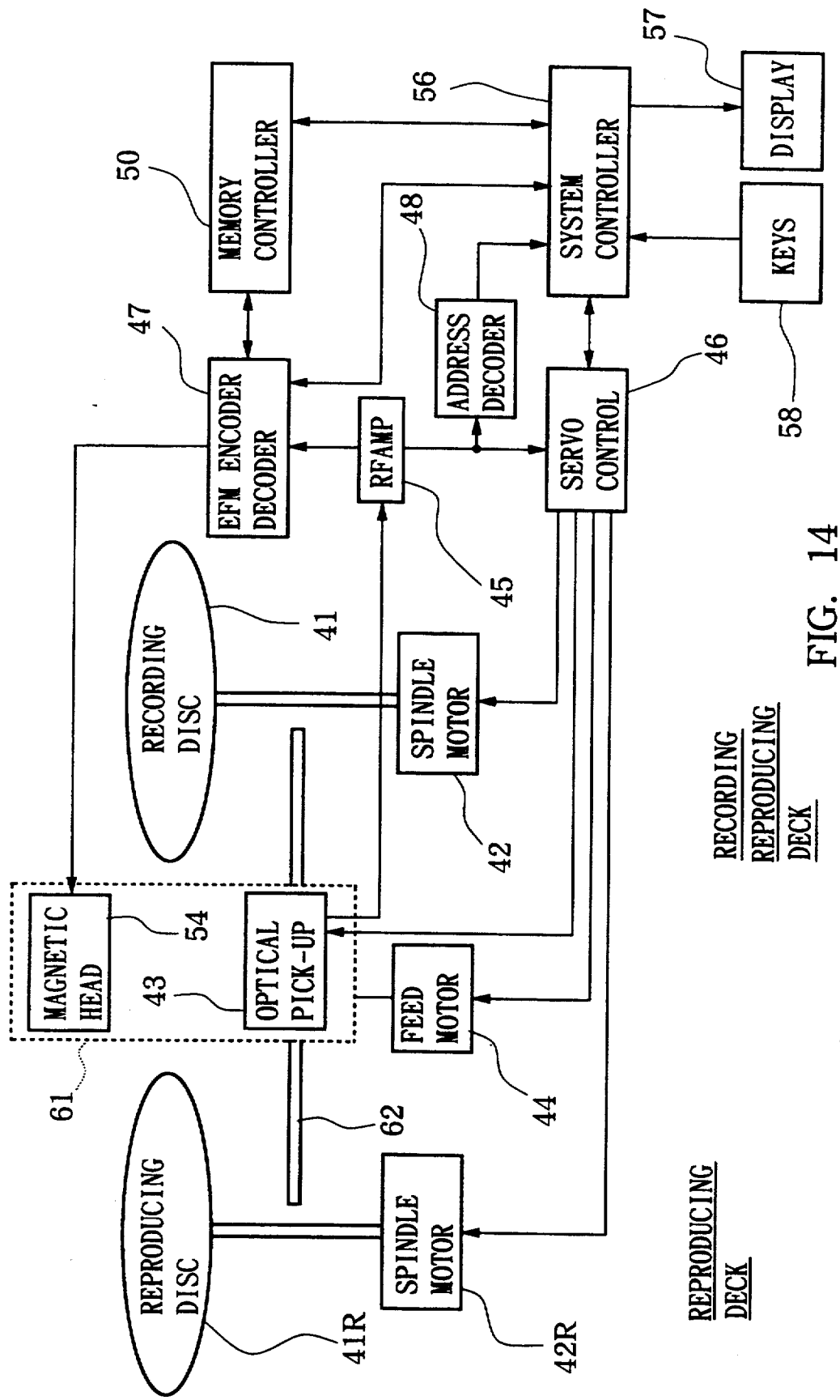
FIG. 14 is a block diagram showing another embodiment of the invention.
Figure 15:
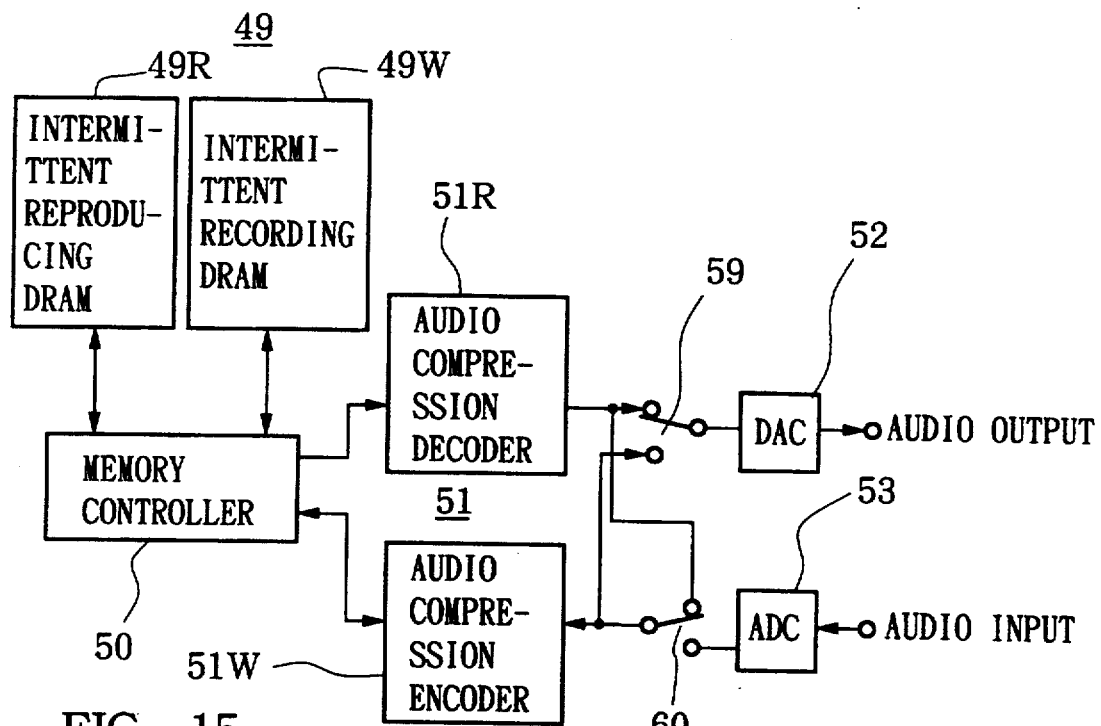
FIG. 15 is a block diagram showing a remaining part of the embodiment of FIG. 14.
Figure 18:
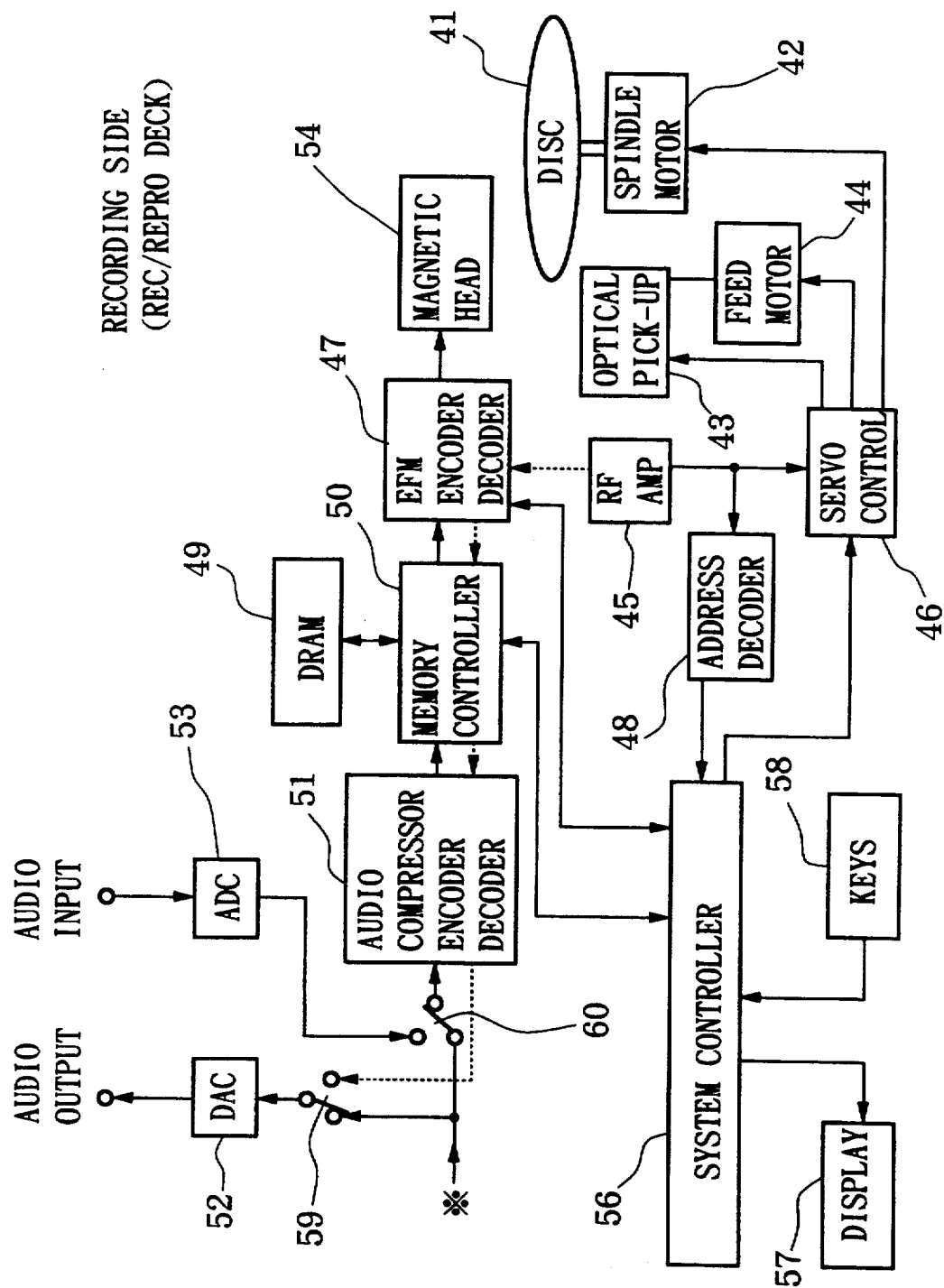
FIG. 18 is a block diagram showing a part of an optical disc recording and reproducing apparatus capable of dubbing.
Figure 19:
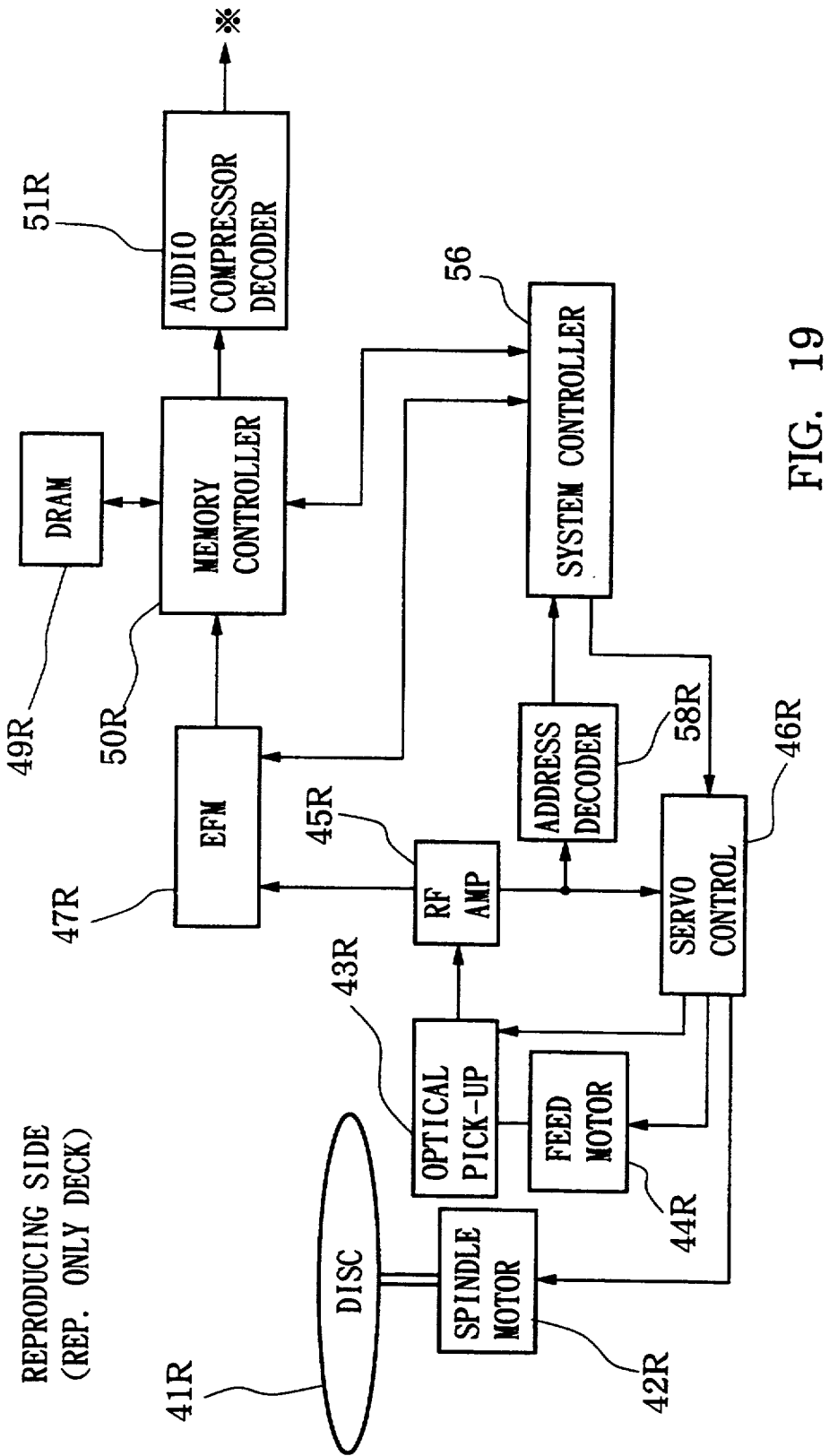
FIG. 19 is a block diagram showing an example of a reproduction only device combined with the recording and reproducing apparatus shown in FIG. 18.

FIG. 14 shows a part of the embodiment applied to a recording and reproducing type MD player and FIG. 15 shows the remaining part of the same embodiment (the memory controller 50 is shown in duplication). The MD player includes a spindle motor 42, an optical pick-up 43, a feed motor 44, a high frequency amplifier 45, a servo control section 46, an EFM encoder/decoder 47, an address decoder 48, a memory 49 consisting of an intermittent reproduction memory 49R and an intermittent recording memory 49W, an intermittent recording reproduction memory controller 50, an audio compressor encoder/decoder 51 consisting of an audio compression decoder 51R and an audio compression encoder 51W, a digital-to-analog converter 52, an analog-to-digital converter 53, a magnetic head 54, a system controller 56, a display 57, operation keys 18, a switch 59 for selecting input to the digital-to-analog converter 52 and a switch 60 for selecting input to the audio compression encoder 51W. In the same manner as the circuit of FIG. 18, the circuit of FIG. 14 is based on the deck which can record and reproduce a signal on the reproducing disc 41 and is added with the spindle motor 42R and a mechanism for moving a head block 61 including a pair of the magnetic head 54 and the optical pick-up 43 by the feed motor 44 over a wide range.

During normal recording and reproduction modes, the head block 61 moves within a range of a disc. During dubbing, the movement between discs is required in addition to the movement within a disc. For this reason, the head moving mechanism includes a guide means such as a guide rail 62 which assists the movement between discs. When the head block 61 moves between the discs along the guide rail 62, the discs 41 and 41R must be mounted on the same plane which is parallel with the guide rail 62. The structure of the head moving mechanism of course is not limited to this structure.

The above described MD player includes a Compact Disc player as its basic component and additionally includes other functions such as an audio compression technique, a vibration-proof technique and a user recording function.

The audio compression performed by the audio compression encoder 61W is made by thinning out unnecessary data by utilizing human hearing characteristics. In a compression technique called ATRAC (Adaptive Transform Acoustic Coding), about five-fold data compression can be realized by utilizing the minimum human hearing characteristic and the masking effect.

The audio compression decoder 51R which restores the compressed data regenerates a digital waveform successively by synthesizing the decoded output of the EFM encoder/decoder 47. By this system, a signal is formed having an equal quality to a signal having level changes of 16-bit stages and a sampling frequency of 44.1 kHz.

For performing this data compression and expansion, the buffer memory 49 having a corresponding capacity is required in the signal processing circuit.

The MD player of this embodiment has the vibration-proof technique against "skipping of sound" described above with respect to the embodiment of FIG. 1. Hence, time for reading data from the disc 1 during the reproduction mode is intermittent one which is about 1/5 of the entire time of the reproduction mode.

The intermittent recording memory 49W can be used also for writing. In this case, the compressed data provided from the audio compression encoder 51W at the rate of 0.3 Mb/sec. is stored temporarily in the memory 49 and then read from the memory 49 and transferred to the EFM encoder/decoder 47 at the reading rate of 1.4 Mb/sec. Since writing on the disc 1 by the recording head 14 is made at 1.4 Mb/sec., this writing becomes intermittent writing using only a part (about 1/5 in this embodiment) of the total processing time.

In the MD player, a reproduction only optical disc may be mounted as the disc 41. By using a recording and reproduction type MD, however, not only reading but also recording can be made. For recording, the magnetic recording head 54 and laser beam of the optical pick-up 43 are used. As this recording method, the magnetic field modulation system in which laser beam of a constant strength is irradiated on the lower surface of the disc 41 and magnetic field modulated by data to be recorded is applied to the upper surface thereof is used.

Figure 17:
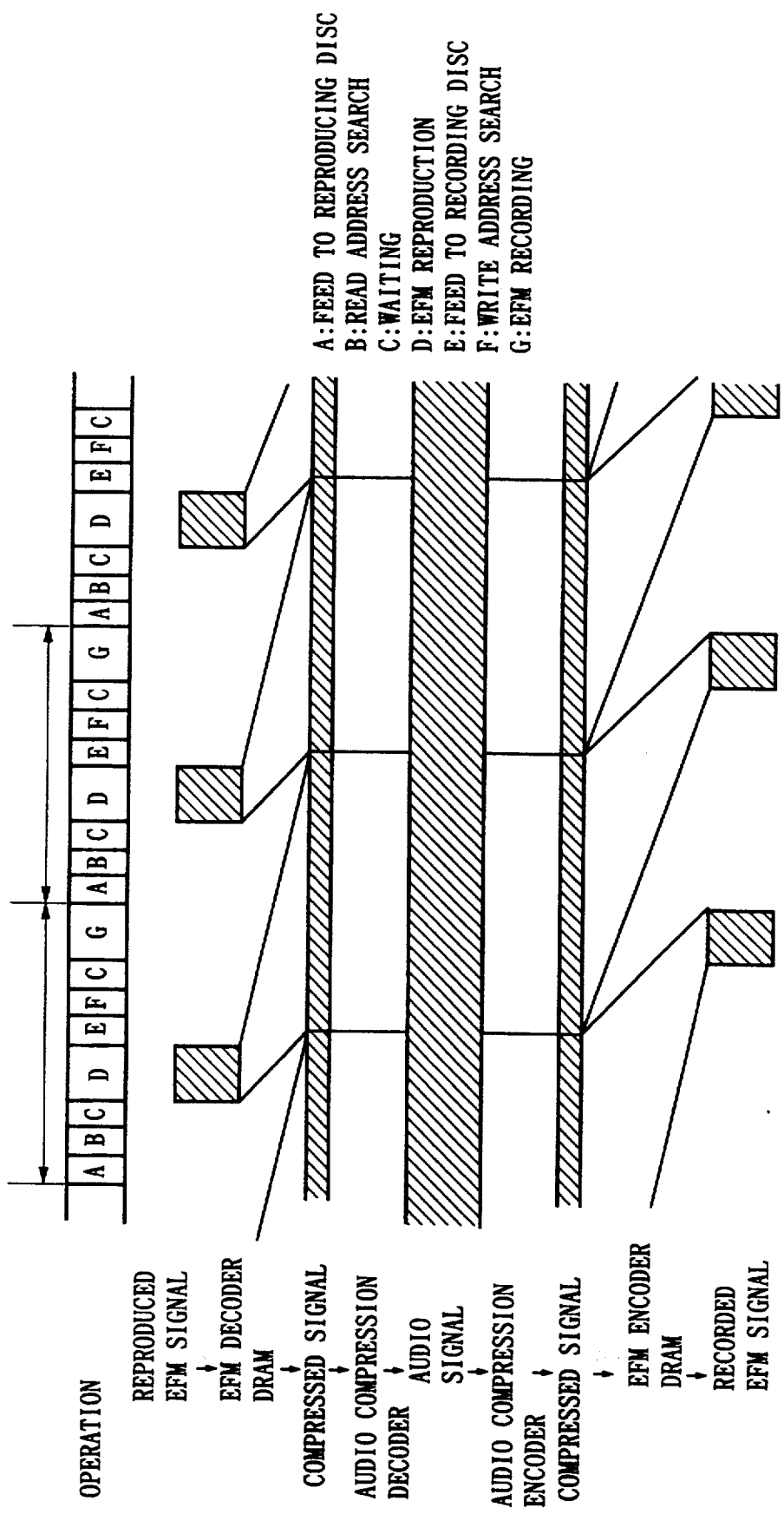
FIG. 17 is a graph for explaining the operation of the embodiment of FIG. 14.

The dubbing operation by this embodiment will now be described with reference to FIG. 17. In this figure, the horizontal axis indicates time base and the vertical axis the flow of signals. At the uppermost stage, time division operation time periods A to G are shown. A represents a period of time during which the heads 43 and 54 are fed to the reproducing disc 41R, B a period of time during which search for a read address is made on the reproducing disc 41R, C waiting time, D an EFM reproduciton period, E a period of time during which the heads 43 and 54 are fed to the recording disc 41. F a period of time during which search for a write address is made on the disc 41, and G an EFM recording period. These operation times are repeated for every predetermined amount of data.

As described above, the ratio of the bit rate of data to be recorded and the bit rate of recording on the disc in the MD system is 1:5 and therefore 4/5 of the entire recording time is waiting time during which no recording on the disc is made. By performing movement of the heads between the discs utilizing this waiting time, reading of data from the reproducing disc 41R and recording of the read out data in the recording disc 41, i.e., dubbing, substantially in real time can be realized.

Describing the dubbing operation more specifically, the system controller 56 controls the servo control section 46 to move the head block 61 to the reproducing disc 41R (period A). Then, search for a read address is made on the reproducing disc 41R by the optical pick-up 43 (period B). Thereafter, EFM data of a predetermined amount is read out by the optical pick-up 43 after lapse of predicted waiting time C. Simultaneously, the EFM encoder/decoder 47 is set to the decoding mode and the EFM data read from the disc 41R is EFM demodulated and accumulated in the intermittent reproduction memory 49R (period D). This operation is made in the reproduction mode.

Then, the system controller 56 controls the servo control section 46 to move the head block 61 to the recording disc 41 (period E). Search for a write address on the recording disc 41 is made by the optical pick-up 43 (period F). After lapse of predicted waiting time C, compressed data (to be described later) of a predetermined amount accumulated in the intermittent recoring memory 49W is read out. Simultaneously, the EFM encoder/decoder 47 is set to the encoding mode and the compressed data read from the memory 49W is EFM modulated again and the modulated data is recorded in the recording disc 41 (period G). This operation is made in the recording mode.

During the reproduction period i n the above described dubbing mode, the compressed data read from the intermittent reproduction memory 49R is supplied to the audio compression decoder 51R for expansion and thereafter is converted to an analog audio signal by the digital-to-analog converter 52. Contents of dubbing, therefore, can be monitored simultaneously.

The expanded output of the audio compression decoder 51R is supplied simultaneously to the audio compression encoder 51W by the switch 60. Therefore, the data which has once been expanded is compressed again and this comressed data is recorded in the intermittent recording memory 49W. This is the compressed data used for dubbing.

It is technically possible to accumulate in the memory 49R compressed data which has been read from the reproducing disc 41R during the reproduction mode and EFM demodulated by the EFM encoder/decoder 47, read the compressed data from the same memory 49R during the recording mode and supply the read out data to the EFM encoder/decoder 47 and record the EFM modulated data in the recording disc 41. By this arrangement, the memories 49R and 49W can be shared commonly and, moreover, the expansion and compression processings in dubbing can be omitted with the result that a single audio compression encoder/decoder will suffice. In this case, the audio expansion processing is necessary only for monitoring of contents of dubbing.

In a case where, as in this embodiment, common heads are moved to and fro for recording and reproduction, it is necessary to invert the polarity of the feed servo between the discs. More specifically, the feed servo in the servo control section 46 for controlling feed servo functions generally in response to an error signal of the tracking servo during tracing. In the structure as in this embodiment in which the guide rail 62 for the optical pick-up 43 is provided between the discs 41 and 41R, the polarity of the feed servo is inverted between the tracing mode of the reproducing disc 41R and the tracing mode of the recording disc 41.

In such a case, it is necessary to cause the polarity of the input (tracking error signal) or output (feed motor drive signal) of the feed servo to be inverted.

Figure 16:
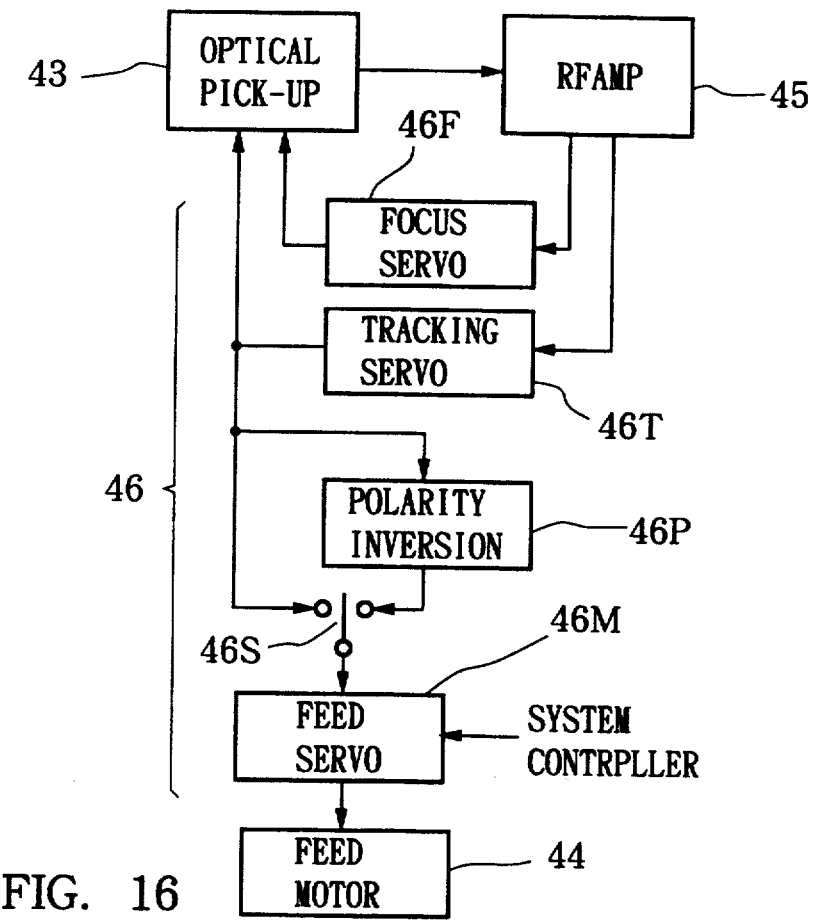
FIG. 16 is a block diagram showing a specific example of a servo control section corresponding to the displacement of the head.

FIG. 16 shows a specific example of the servo control section 46 constructed to invert the input polarity of the feed servo. The servo control section 46 includes a focus servo circuit 46F of the optical pick-up 43, a tracking servo circuit 46T of the optical pick-up 43, a polarity inverting circuit 46P for inverting the polarity of the tracking error signal, a selection switch 46S for selecting either the original tracking error signal or the output of the polarity inversion circuit 46P, and a feed servo circuit 46M for supplying a drive signal to the feed motor 44.

In the above described embodiment, the heads are moved between the discs for dubbing. In a case where the reproducing disc and the recording disc can be changed by a disc changing mechanism such as an automatic disc changer, the movement of the heads between the discs is unnecessary. In such a case, time required for changing the disc is considered to be longer than time required for movement of the head between the discs and, therefore, the memory 49 should have a sufficient memory capacity to cope with the time required for changing of the disc.

Further, in the case of moving the heads between the discs, the magnetic head which is used only for recording may be left on the recording side and the optical head only may be moved to the reproducing disc side.

The above described various embodiments relate to an MD but this invention is not limited to an MD. The invention is applicable also to other discs in which intermittent recording is made as in an MD. The disc to which the invention is applicable is not limited to a magneto-optical disc but the invention is applicable also to other types of discs including an optical disc and a magnetic disc.

What is claimed is:

1. An apparatus for recording and reproducing a signal on a disc type recording medium comprising:
    recording means for intermittently writing on a disc data to be recorded during a recording mode whose average bit rate is ½ or less of a rate of recording data on the disc;
    reproduction means for intermittently reading from the disc during a reproduction mode reproduced data whose average bit rate is ½ or less of a rate of reproducing data from the disc; and
    write and/or read means for performing writing and/or reading on the disc during waiting time between said intermittent writing and/or reading in the recording and/or reproduction mode.

2. An apparatus as defined in claim 1 wherein the write and/or read means comprises recorded signal monitoring means for reading out immediately preceding recorded data during waiting time in the recording mode.

3. An apparatus as defined in claim 1 wherein the recording means comprises a recorded signal processing section for processing the data to be recorded and the reproduction means comprises a reproduced signal processing section for processing the reproduced data; and
    said reproduced signal processing section processes the reproduced data during the waiting time in the recording mode thereby to monitor the recorded signal.

4. An apparatus as defined in claim 1 wherein the recording means comprises a recorded signal processing section for processing the data to be recorded and the reproduction means comprises a reproduced signal processing section for processing the reproduced data;
    said recorded signal processing section comprises a recording memory for temporarily storing the data to be recorded on the disc and said reproduced signal processing section comprises a reproducing memory for temporarily storing the reproduced data read from the disc; and
    recording by the recording means and reproduction by the reproduction means are performed by performing writing in and reading from the recording memory and the reproducing memory alternately within a range allowed by the capacities of the respective memories.

5. An apparatus as defined in claim 4 where in the writing by said recording means is made at an address which is the same as or in a predetermined relation with an address at which the reproduced data has been read out.

6. An apparatus as defined in claim 5 further comprising recorded data selection means for selecting, as the data to be recorded by the recording means, one of the reproduced data reproduced by the reproduction means, new data supplied from outside the apparatus, and synthesized data of said reproduced data reproduced by said reproduction means and said new data supplied from outside the apparatus.

7. An apparatus as defined in claim 1 wherein the recording means comprises first and second recorded signal processing sections for processing respectively first and second data to be recorded and the reproduction means comprises first and second reproduced signal processing sections for processing respectively first and second reproduced data;
    said disc comprises a first area in which recording processing by said first recorded signal processing section and reproduction processing by said first reproduced signal processing section are made and a second area in which recording processing by said second recorded signal processing section and reproduction processing by said second reproduced signal processing section are made; and
    the recording processing and reproduction processing by said first recorded signal processing section and said first reproduced signal processing section and the recording processing and reproduction processing by said second recorded signal processing section and said second reproduced signal processing section are performed alternately in the first and second areas of said disc.

8. An apparatus as defined in claim 7 further comprising means for recording the first and second data to be recorded on said disc while maintaining difference in addresses at which the first and second data are to be recorded and synchronizing recording of the first and second data.

9. An apparatus as defined in claim 1 further comprising:
    disc drive means for reproducing data from a first disc and writing said reproduced data onto a second disc in which data is to be recorded; and
    head means which is driven to reproduce data from said first disc and, during said waiting time in reproducing data from said first disc, said head means is driven to record the reproduced data in said second disc, said head means being moved between said second disc and said first disc to perform recording and reproduction alternately.

* * * * *